(12) United States Patent
Carlini et al.

(10) Patent No.: US 8,888,907 B2
(45) Date of Patent: Nov. 18, 2014

(54) SOLID PHASE CHANGE INK COMPOSITIONS COMPRISING OXAZOLINES

(75) Inventors: Rina Carlini, Oakville (CA); Adela Goredema, Road Mississauga (CA); Guerino G. Sacripante, Oakville (CA); Caroline M. Turek, Mississauga (CA); Edward G. Zwartz, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 102 days.

(21) Appl. No.: 13/196,691

(22) Filed: Aug. 2, 2011

(65) Prior Publication Data

US 2013/0032057 A1 Feb. 7, 2013

(51) Int. Cl.
*C09D 11/02* (2014.01)
*C09D 11/34* (2014.01)
*C09D 11/38* (2014.01)

(52) U.S. Cl.
CPC ............... *C09D 11/38* (2013.01); *C09D 11/34* (2013.01)
USPC ..................................... 106/31.61; 106/31.13

(58) Field of Classification Search
None
See application file for complete search history.

(56) References Cited

U.S. PATENT DOCUMENTS

| 5,195,430 | A | 3/1993 | Rise |
| 5,231,135 | A | 7/1993 | Machell et al. |
| 5,372,852 | A | 12/1994 | Titterington et al. |
| 5,389,958 | A | 2/1995 | Bui et al. |
| 5,496,879 | A | 3/1996 | Griebel et al. |
| 5,621,022 | A | 4/1997 | Jaeger et al. |
| 5,698,017 | A | 12/1997 | Sacripante et al. |
| 5,817,169 | A | 10/1998 | Sacripante et al. |
| 6,221,137 | B1 | 4/2001 | King et al. |
| 6,334,890 | B1 * | 1/2002 | Goodbrand et al. ....... 106/31.43 |
| 6,472,523 | B1 | 10/2002 | Banning et al. |
| 6,547,380 | B2 | 4/2003 | Smith et al. |
| 6,590,082 | B1 | 7/2003 | Banning et al. |
| 6,646,111 | B1 | 11/2003 | Carlini et al. |
| 6,713,614 | B2 | 3/2004 | Carlini et al. |
| 6,958,406 | B2 | 10/2005 | Banning et al. |

(Continued)

FOREIGN PATENT DOCUMENTS

| DE | 42 05 636 A1 | 8/1993 |
| DE | 42 05 713 A1 | 8/1993 |
| JP | 2005-208133 | * 8/2005 ................ G03F 7/00 |

OTHER PUBLICATIONS

U.S.S.N. (Not yet assigned) filed Aug. 2, 2011, entitled, "Phase Chanae Inks Containing Oxazoline Compounds and Polyterpene Resins," to Carlini et al.

(Continued)

*Primary Examiner* — Yun Qian
(74) *Attorney, Agent, or Firm* — Pillsbury Winthrop Shaw Pittman LLP

(57) ABSTRACT

A solid ink composition comprising at least one crystalline oxazoline compound and at least one amorphous component derived from a polyol, and a colorant and optional viscosity modifier, which are suitable for inkjet printing, including printing on coated paper substrates. In embodiments, the solid ink formulation comprises a blend of an amorphous and crystalline components which provides a solid ink with excellent robustness when forming images or printing on coated paper substrates.

17 Claims, 2 Drawing Sheets

(56) References Cited

U.S. PATENT DOCUMENTS

| | | |
|---|---|---|
| 6,998,493 B2 | 2/2006 | Banning et al. |
| 7,063,410 B2 | 6/2006 | Slotto et al. |
| 7,211,131 B2 | 5/2007 | Banning et al. |
| 7,294,730 B2 | 11/2007 | Banning et al. |
| 7,381,831 B1 | 6/2008 | Banning et al. |
| 7,427,323 B1 | 9/2008 | Birau et al. |
| 7,448,719 B1 | 11/2008 | Newell |
| 7,465,348 B1 | 12/2008 | Carlini et al. |
| 7,503,973 B1 | 3/2009 | Carlini et al. |
| 7,732,581 B2 | 6/2010 | Banning et al. |
| 7,905,954 B2 | 3/2011 | Carlini et al. |
| 2010/0086683 A1 | 4/2010 | Birau et al. |

OTHER PUBLICATIONS

U.S.S.N. (Not yet assigned) filed Aug. 2, 2011, entitled, "Phase Change Inks Containing Crystalline Trans-Cinnamic Diesters and Amorphous Isosorbide Oligomers," to Adela Goredema et al.

Chemical Reviews, R. H Wiley and L. L. Bennett, vol. 44, (1949), pp. 447-476.

Heterocyclic Compounds, J. W. Cornforth, 1957, chapter 5, pp. 300-417.

European Journal of Medicinal Chemistry, Garrett C. Moraski et al., vol. 45, 2010, pp. 1703-1716.

Journal of the Chemical Society, A. I. Meyers and D. L. Temple, vol. 92, (1970), p. 6644.

* cited by examiner

SOLID PHASE CHANGE INK COMPOSITIONS COMPRISING OXAZOLINES

CROSS-REFERENCE TO RELATED APPLICATIONS

Reference is made to U.S. patent application Ser. No. 13/196,157, filed concurrently herewith, entitled "Phase Change Inks Containing Oxazoline Compounds and Polyterpene Resins," to Rina Carlini et al., the disclosure of which is totally incorporated herein by reference.

Reference is made to U.S. application Ser. No. 13/196,227, filed concurrently herewith, entitled "Phase Change Inks Containing Crystalline Trans-Cinnamic Diesters and Amorphous Isosorbide Oligomers," to Adele Goredema at al., the disclosure of which is totally incorporated herein by reference.

BACKGROUND

The present embodiments relate to phase change or solid ink compositions characterized by being solid at room temperature and molten at an elevated temperature at which the molten ink is applied to a substrate. These solid ink compositions can be used for ink jet printing. The present embodiments are directed to a novel solid phase change ink composition comprising a crystalline oxazoline compound, an amorphous component that is derived from polyols, and optionally a colorant, and methods of making the same.

Solid phase change inks (also referred to as "phase change inks" and "hot melt inks") have been used in various liquid deposition techniques. Solid phase change inks are in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Phase change inks have also been used in other printing technologies, such as gravure printing, as disclosed in, for example, U.S. Pat. No. 5,496,879 and German Patent Publications DE 4205636AL and DE 4205713AL, the disclosures of which are totally incorporated herein by reference.

Solid inks have also been used for applications such as postal marking, industrial and office marking, labeling, and for rapid 3-dimensional prototyping of objects.

Solid inks are desirable for ink jet printers because they remain in a solid phase at room temperature, for example, 20° C. to about 35° C., which is convenient during shipping and ink handling, enables long term storage, and ease of use. In addition, the problems associated with nozzle clogging as a result of ink evaporation with other aqueous or solvent-based liquid ink jet inks are largely eliminated, thereby greatly improving the reliability of the ink jet printing. Further, in solid ink jet printers wherein the ink droplets are applied directly onto the final recording substrate (for example, paper, transparency material, and the like), the droplets solidify immediately upon contact with the substrate, so that migration of ink along the printing medium is prevented and image quality is improved.

Ink jet printing systems generally are of two types: continuous stream and drop-on-demand, as described in U.S. Pat. No. 6,547,380. The entire disclosures of U.S. Pat. Nos. 5,195,430 and 6,547,380 are totally incorporated herein by reference.

There are at least three types of drop-on-demand ink jet systems. One type of drop-on-demand system is a piezoelectric device that has as its major components an ink filled channel or passageway having a nozzle on one end and a piezoelectric transducer near the other end to produce pressure pulses. Another type of drop-on-demand system is known as acoustic ink printing. Still another type of drop-on-demand system is known as thermal ink jet, or bubble jet, and produces high velocity droplets.

In a typical design of a piezoelectric ink jet device utilizing solid inks, whether printed directly onto a substrate or onto an intermediate transfer member, such as the ones described in U.S. Pat. Nos. 5,372,852; 7,063,410; and 7,448,719 the disclosures of which are hereby incorporated by reference in their entireties, droplets of liquid ink are ejected from the printing device at the printhead operating temperature. When the ink droplets contact the surface of the recording substrate, either directly or via an intermediate heated transfer belt or drum, they rapidly solidify to form a predetermined pattern of solidified ink drops.

Many solid inks typically used with ink jet printers are comprised of (semi)crystalline and polymer waxes as part of the ink vehicle (or ink base). Crystalline waxes and other functional wax components enable the sharp melting of the ink and narrow phase-change transitions from the molten liquid state to the solid state. The wax components also reduce the coefficient of friction of the printed image, which aids the automated feeding of printed documents across the glass platen and other subsystems of the printer. Such wax-based, solid ink jet inks provide vivid color images.

In typical systems, these crystalline wax inks partially cool on an intermediate transfer member and are then pressed into the image receiving medium such as paper. Transfuse action spreads the image droplet, providing a richer color and lower pile height. The low flow of the solid ink also prevents show through on the paper.

However, the use of crystalline waxes can pose some limitations on the printed image. Conventional crystalline waxes are non-polar hydrocarbon polymers and aliphatic molecules, which are attracted together by weak, non-covalent van der Waals forces. Such waxes typically have poor adhesion to paper substrates because there is low affinity for the higher polarity paper. This mismatch of intermolecular forces and polarity between ink and substrate can make the wax-based solid prints vulnerable to mechanical damage, such as abrasions and creases, which can lead to poor image robustness and lower image quality. Further, the nonpolarity of these ink components often leads to compatibility issues with commonly available commercial dyes and pigments, resulting in the need for custom-designed colorants to ensure good solubility or dispersibility in the ink carrier and good long-term thermal stability to prevent colorant degradation or colorant migration. There is consequently a need for new solid ink compositions having higher polarity than wax-based inks and that have good affinity for a wide variety of paper substrates. There is also a need for new solid ink compositions of higher polarity and good compatibility with commercially available colorants and ink additives. There is furthermore a need for such new ink compositions to have improved durability on paper substrates compared with wax-based solid inks.

Oxazolines are a promising class of heterocyclic compounds which have been previously reported for medical, pharmaceutical, and veterinary uses, and also as additives in personal care and consumer product formulations, such as shampoos, detergents, and the like, and in oleaginous compositions such as mechanical lubricating oils and as oil and sludge dispersants. Oxazolines can be prepared efficiently in one or more reaction steps from simple starting materials, which are typically an organic carboxylic acid and a primary amino alcohol. Detailed reviews of the chemistry of oxazoles and oxazoline compounds are known, as illustrated by R. H. Wiley and L. L. Bennett in *Chemical Reviews*, Vol. 44, pp. 447-476 (1949), and also extensively described by J. W. Cornforth in *Heterocyclic Compounds,* 1957, chapter 5, pp. 300-417, the disclosures of each of which are totally incorporated herein by reference. Furthermore, oxazoline derivatives being the major product from the reaction of an organic acid and amino alcohol is also known, such as disclosed by A. I. Meyers and D. L. Temple in *Journal of the Chemical Society*, Vol. 92, p. 6644 (1970), the disclosure of which is totally incorporated herein by reference. Further, in Garrett C. Moraski et al. in *European Journal of Medicinal Chemistry,* 45, (2010), 1703-1716, the disclosure of which is totally incorporated herein by reference, there is described low toxicity anti-tuberculosis agents derived from o-hydroxy phenyl-oxazoline and o-hydroxy phenyl-oxazole benzyl esters.

While known materials and processes are suitable for their intended purposes, there is a need for improved phase change inks. In addition, there is a need for phase change inks that exhibit sharp and rapid phase transitions from the molten liquid state to the solid state. Further, there is a need for phase change inks that exhibit good adhesion to paper substrates, including coated and uncoated paper substrates. Additionally, there is a need for phase change inks that exhibit good image robustness, such as scratch-resistance. In addition, a need remains for phase change inks that exhibit good 'paper fold' performance and reduced cracking and creasing of the image when the document is folded. Additionally, a need remains for phase change inks that exhibit good compatibility with commonly available colorants. In addition, there is a need for phase change inks that are suitable for ink jet printing under a variety of conditions, such as direct-to-paper (DTP) printing conditions. Further, there is a need for phase change ink compositions prepared from low-cost raw materials, that are compatible with a wide variety of papers that generate high quality images on a wide variety of papers. These and other needs and advantages can be achievable with the solid ink compositions comprising crystalline oxazoline compounds and amorphous compounds derived from polyols of the present disclosure.

Each of the foregoing U.S. Patents and Patent Publications are incorporated by reference herein. Further, the appropriate components and process aspects of the each of the foregoing U.S. Patents and Patent Publications may be selected for the present disclosure in embodiments thereof.

SUMMARY

According to embodiments illustrated herein, there is provided novel solid ink compositions comprising at least one crystalline oxazoline compound and at least one amorphous component derived from a polyol, and a colorant and optional viscosity modifier, that exhibit excellent image robustness for ink jet printing, including printing on coated paper substrates.

In particular, the present embodiments provide a solid ink composition comprising at least one phase change component; at least one amorphous component derived from a polyol; a colorant; and optionally a viscosity modifier, wherein the phase change component is crystalline and comprises one or more substituted oxazoline compounds and/or substituted oxazoline derivatives and further wherein the solid ink composition exhibits a phase change transition from a liquid to a solid.

In further embodiments, there is provided a solid ink composition comprising at least one phase change component; at least one amorphous component being a polyol derivative having from two to twenty hydroxyl groups; a colorant; and optionally a viscosity modifier, wherein the phase change component comprises one or more substituted oxazoline compounds and/or substituted oxazoline derivatives represented by the following formula

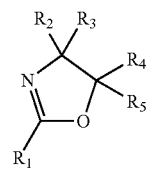

wherein $R_1$ is an alkyl group of from about 1 to about 55 carbon atoms, $R_2$, $R_3$, $R_4$ and $R_5$ are alkyl, an alkyl alcohol or an alkyl ester, each alkyl containing from about 1 to about 55 carbon atoms, and further wherein the solid ink composition exhibits a phase change transition from a liquid to a solid within a temperature change of about 20° C.

In yet other embodiments, there is provided a solid ink composition comprising at least one phase change component; at least one amorphous component derived from a polyol; a colorant; and optionally a viscosity modifier, wherein the phase change component is crystalline and comprises one or more substituted oxazoline compounds and/or substituted oxazoline derivatives and further wherein the solid ink composition exhibits a phase change transition from a liquid to a solid within a temperature change of about 20° C., and the phase transition occurs at a temperature between about 45 and about 130° C.

BRIEF DESCRIPTION OF THE DRAWINGS

For a better understanding of the present embodiments, reference may be had to the accompanying figures.

DETAILED DESCRIPTION

Figure 1:
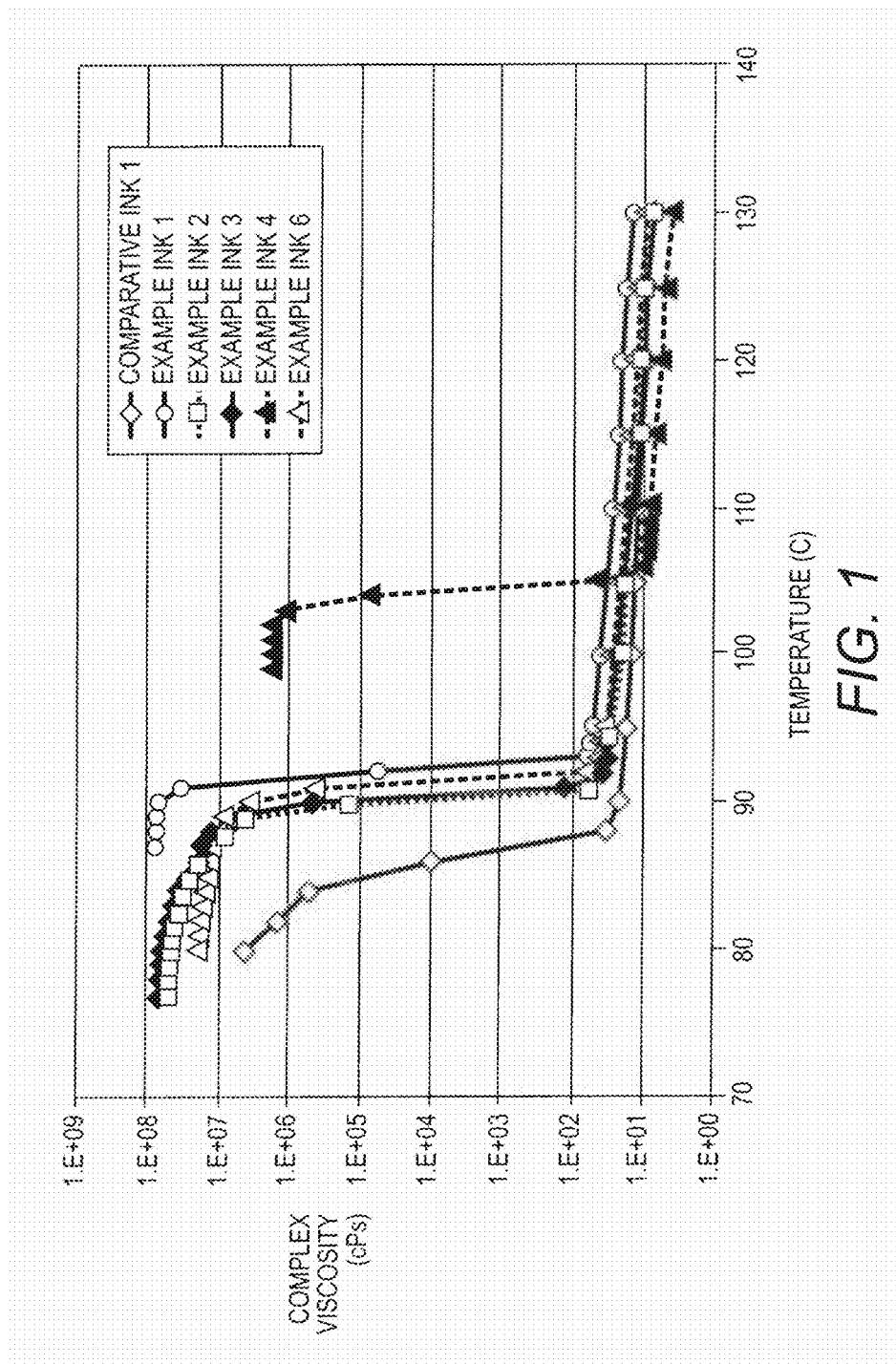
FIG. 1 is a graph illustrating rheology data of some ink samples of the present embodiments as compared to the control ink samples.
Figure 2:
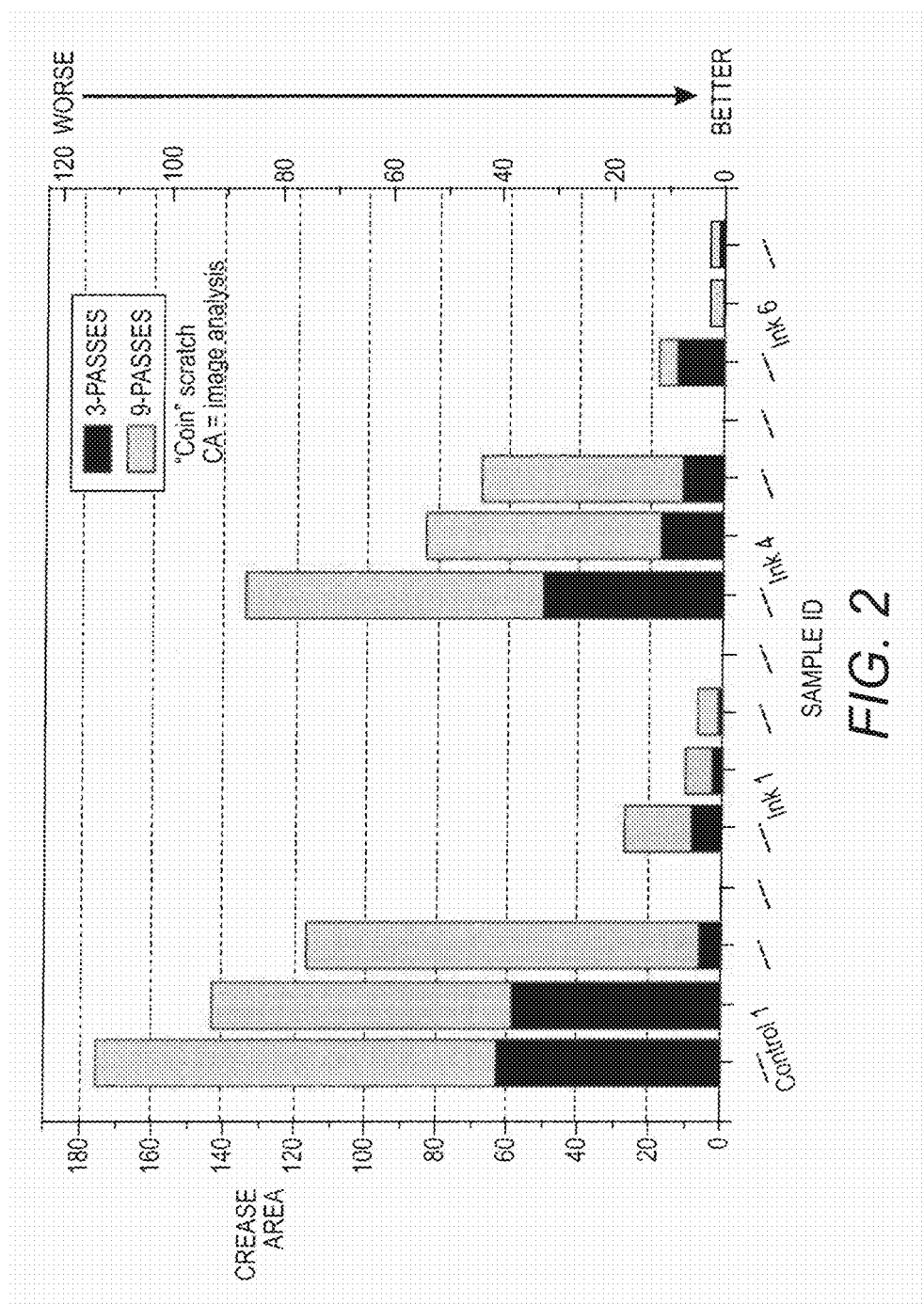
FIG. 2 is a graph illustrating the scratch results of some ink samples of the present embodiments as compared to the control ink samples; All of the rheology measurements were made on a Rheometrics RFS3 strain-controlled rheometer (TA instruments) equipped with a Peltier heating plate and using a 25 mm parallel plate geometry tool. The method used was a temperature sweep starting from about 140° C. to about 40° C. in temperature steps of 5° C., a soak (equilibration) time of 75 seconds between each temperature and measured at a constant frequency of 1 Hz.

In the following description, it is understood that other embodiments may be utilized and structural and operational changes may be made without departure from the scope of the present embodiments disclosed herein.

Phase change or solid ink technology broadens printing capability and customer base across many markets, and the diversity of printing applications will be facilitated by effective integration of printhead technology, print process and ink materials. The solid ink compositions are characterized by being solid at room temperature and molten at an elevated temperature at which the molten ink is applied to a substrate. As discussed above, while current ink options are successful for porous paper substrates, these options are not always satisfactory for coated paper substrates.

In the present embodiments, it is discovered that a robust solid ink can be obtained through a blend of crystalline and amorphous components. The present embodiments provide a new type of ink jet solid ink composition which comprises a blend of (1) at least one crystalline oxazoline compound; (2) at least one amorphous component derived from a polyol; (3) an optional viscosity modifier; and 4) a colorant. In these embodiments, the crystalline component acts as the phase change component while the amorphous component acts as the binder.

As used herein, the term "viscosity" refers to a complex viscosity, which is the typical measurement provided by a mechanical spectrometer that is capable of subjecting a sample to a steady shear strain or a small amplitude sinusoidal deformation. Each component imparts specific properties to the solid inks, and the blend of the components provide inks that have suitable viscosity for inkjet printing in a piezoelectric printhead, and also exhibit excellent robustness on uncoated and coated substrates.

Ink Components

The inks disclosed herein contain a crystalline component which comprises at least one or more oxazoline compounds. Examples of suitable oxazoline compounds include (but are not limited to) those of the formula

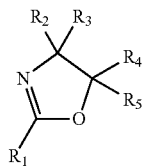

wherein:

$R_1$ is (1) an alkyl group, including linear, branched, saturated, unsaturated, cyclic, substituted, and unsubstituted alkyl groups, and wherein hetero atoms, such as oxygen, nitrogen, sulfur, silicon, phosphorus, and the like either may or may not be present in the alkyl group, in one embodiment with at least about 1 carbon atom, and in another embodiment with at least about 5 carbon atoms, and in one embodiment with no more than about 60 carbon atoms, in another embodiment with no more than about 36 carbon atoms, and in yet another embodiment with no more than about 25 carbon atoms, although the number of carbon atoms can be outside of these ranges, (2) an aryl group, including substituted and unsubstituted aryl groups, and wherein hetero atoms, such as oxygen, nitrogen, sulfur, silicon, phosphorus, and the like either may or may not be present in the aryl group, in one embodiment with at least about 5 carbon atoms, and in another embodiment with at least about 6 carbon atoms, and in one embodiment with no more than about 24 carbon atoms, in another embodiment with no more than about 18 carbon atoms, and in yet another embodiment with no more than about 14 carbon atoms, although the number of carbon atoms can be outside of these ranges, such as phenyl or the like, (3) an arylalkyl group, including substituted and unsubstituted arylalkyl groups, wherein the alkyl portion of the arylalkyl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the arylalkyl group, in one embodiment with at least about 6 carbon atoms, and in another embodiment with at least about 7 carbon atoms, and in one embodiment with no more than about 36 carbon atoms, in another embodiment with no more than about 24 carbon atoms, and in yet another embodiment with no more than about 18 carbon atoms, although the number of carbon atoms can be outside of these ranges, such as benzyl or the like, or (4) an alkylaryl group, including substituted and unsubstituted alkylaryl groups, wherein the alkyl portion of the alkylaryl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylaryl group, in one embodiment with at least about 6 carbon atoms, and in another embodiment with at least about 7 carbon atoms, and in one embodiment with no more than about 36 carbon atoms, in another embodiment with no more than about 24 carbon atoms, and in yet another embodiment with no more than about 18 carbon atoms, although the number of carbon atoms can be outside of these ranges, such as tolyl or the like; and $R_2$, $R_3$, $R_4$, and $R_5$ each, independently of the other, are (1) hydrogen atoms, (2) halogen atoms, such as fluorine, chlorine, bromine, or iodine, (3) alkyl groups, including linear, branched, saturated, unsaturated, cyclic, substituted, and unsubstituted alkyl groups, and wherein hetero atoms, such as oxygen, nitrogen, sulfur, silicon, phosphorus, and the like either may or may not be present in the alkyl group, in one embodiment with at least about 1 carbon atoms, in another embodiment with at least about 2 carbon atoms, and in yet another embodiment with at least about 3 carbon atoms, and in one embodiment with no more than about 36 carbon atoms, and in another embodiment with no more than about 30 carbon atoms, although the number of carbon atoms can be outside of these ranges, (4) aryl groups, including substituted and unsubstituted aryl groups, and wherein hetero atoms, such as oxygen, nitrogen, sulfur, silicon, phosphorus, and the like either may or may not be present in the aryl group, in one embodiment with at least about 5 carbon atoms, and in another embodiment with at least about 6 carbon atoms, and in one embodiment with no more than about 24 carbon atoms, and in another embodiment with no more than about 18 carbon atoms, although the number of carbon atoms can be outside of these ranges, such as phenyl or the like, (5) arylalkyl groups, including substituted and unsubstituted arylalkyl groups, wherein the alkyl portion of the arylalkyl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the arylalkyl group, in one embodiment with at least about 6 carbon atoms, and in another embodiment with at least about 7 carbon atoms, and in one embodiment with no more than about 36 carbon atoms, and in another embodiment with no more than about 24 carbon atoms, although the number of carbon atoms can be outside of these ranges, such as benzyl or the like, or (6) alkylaryl groups, including substituted and unsubstituted alkylaryl groups, wherein the alkyl portion of the alkylaryl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylaryl group, in one embodiment with at least about 6 carbon atoms, and in another embodiment with at least about 7 carbon atoms, and in one embodiment with no more than about 36 carbon atoms, and in another embodiment with no more than about 24 carbon atoms, although the number of carbon atoms can be outside of these ranges, such as tolyl or the like, wherein the substituents on the substituted alkyl, aryl, arylalkyl, and alkylaryl groups for $R_1$, $R_2$, $R_3$, $R_4$, and $R_5$ can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring.

In one specific embodiment, $R_1$ is an alkyl group, such as a linear unsubstituted aliphatic group. In another specific embodiment, $R_1$ is an alkylaryl group, such as a group of the formula

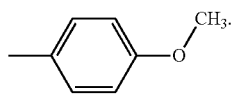

In one specific embodiment, $R_2$, $R_3$, $R_4$, and $R_5$ each, independently of the others, are unsubstituted alkyl groups, or hydroxyalkyl groups, such as those of the formula $-(CH_2)_n OH$ wherein n is an integer of in one embodiment at least about 1, and in another embodiment at least about 2, and in one embodiment no more than about 12, and in another embodiment no more than about 10, although the value of n can be outside of these ranges, or alkyl ester groups, such as those of the formula $-(CH_2)_p-OOC(CH_2)_m-CH_3$ wherein p is an integer of in one embodiment at least about 1, and in another embodiment at least about 2, and in one embodiment no more than about 12, and in another embodiment no more than about 10, although the value of p can be outside of these ranges, and m is an integer of in one embodiment at least about 1, and in another embodiment at least about 2, and in one embodiment no more than about 36, and in another embodiment no more than about 24, although the value of m can be outside of these ranges.

In one specific embodiment, the oxazoline is of the formula

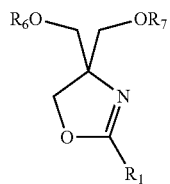

wherein $R_1$ is as defined hereinabove and wherein $R_5$ and $R_7$ each, independently of the other, is (1) a hydrogen atom, or (2) a group of the formula

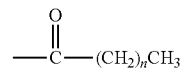

wherein n is 0 or an integer of from 1 to about 36.

Specific examples of suitable oxazoline compounds, all of which are crystalline at room temperature, include (but are not limited to) (as indicated below with melting and crystallization temperatures measured by Differential Scanning Calorimetry at a scan rate of 10° C. per minute):

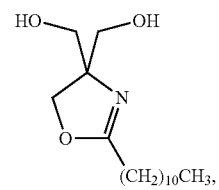

$T_{melt} = 97°$ C.; $T_{cryst} = 73°$ C.

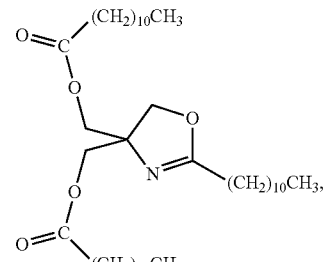

$T_{melt} = 98°$ C.; $T_{cryst} = 72.4°$ C.

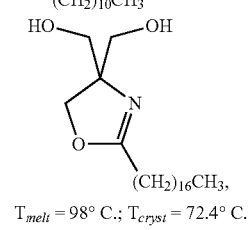

$T_{melt} = 60°$ C.; $T_{cryst} = 45°$ C.

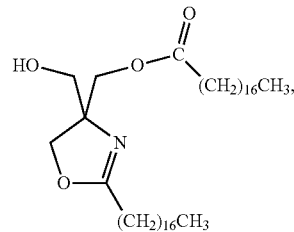

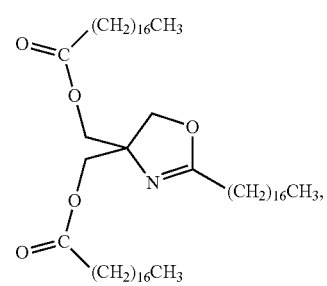

$T_{melt} = 56°$ C.; $T_{cryst} = 33°$ C.

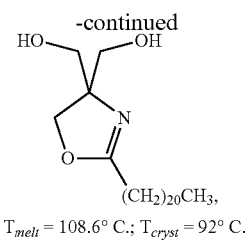

-continued $T_{melt} = 108.6°\ C.; T_{cryst} = 92°\ C.$ and the like, as well as mixtures thereof.

Oxazolines can be prepared by any desired or effective method, such as by a condensation reaction at elevated temperatures between an acid having an R group with at least 1 molar equivalent of an amino alcohol. Oxazolines can also be prepared as described in, for example, U.S. Pat. Nos. 5,817,169 and 5,698,017 and in R. H Wiley and L. L. Bennett, *Chemical Reviews*, Vol. 44, pp. 447-476 (1949), J. W. Cornforth, *Heterocyclic Compounds,* 1957, chapter 5, pp. 300-417, and A. I. Meyers and D. L. Temple, *Journal of the Chemical Society*, Vol, 92, p. 6644 (1970), the disclosures of each of which are totally incorporated herein by reference.

The substituted oxazoline compounds of the formula

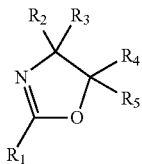

can be prepared in one embodiment by a condensation reaction occurring at a suitable temperature, such as from about 120° C. to about 220° C., of an acid having an $R_1$ group as defined hereinabove with at least 1 molar equivalent of a suitable amino alcohol per mole of acid. The condensation reaction between the acid and the amino alcohol can be performed at reduced pressure, such as less than about 100 mmHg. The condensation reaction can be carried out with or without the use of a catalyst; catalysts can be used to expedite completion of the reaction. Suitable catalysts include tetraalkyl titanates, dialkyltin oxides such as dibutyltin oxide (dibutyl oxostannane), tetraalkyltin oxide compounds such as dibutyltin dilaurate, dialkylstannoic acid compounds such as butylstannoic acid, aluminum alkoxides, alkyl zinc, dialkyl zinc, zinc oxide, stannous oxide, or mixtures thereof; and which catalysts are selected in amounts of, for example, from about 0.005 mole percent to about 5 mole percent based on the starting diacid. In some embodiments, the condensation reaction is complete (i.e., at least about 95% of the diacid has been reacted) in less than about 15 hours.

In a specific embodiment, the crystalline oxazoline compounds disclosed herein have sufficiently low viscosities in the molten state that render them highly suitable for use as crystalline phase change agents in solid inks for ink jet printing. In these embodiments, the crystalline oxazoline compounds, such as the specific compounds illustrated hereinabove, can have complex viscosities when measured at temperatures above about 110° C., of in one embodiment at least about 1 cPs (centipoise, or mPa-sec), in another embodiment at least about 2 cPs, and in yet another embodiment at least about 3 cPs, and in one embodiment no more than about 20 cPs, in another embodiment no more than about 15 cPs, and in yet another embodiment no more than about 13 cPs, although the complex viscosity can be outside of these ranges. At room temperature, the complex viscosity of the crystalline oxazoline compounds disclosed herein can be about $1 \times 10^5$ cPs.

The crystalline oxazoline compound is present in the ink carrier in any desired or effective amount, in one embodiment at least about 1 percent by weight, in another embodiment at least about 2 percent by weight, and in yet another embodiment at least about 5 percent by weight, and in one embodiment no more than about 95 percent by weight, in another embodiment no more than about 90 percent by weight, and in yet another embodiment no more than about 85 percent by weight, although the amount can be outside of these ranges.

The crystalline oxazoline compound is present in the ink in a total amount in any desired or effective amount, in one embodiment at least about 10 percent by weight, in another embodiment at least about 20 percent by weight, and in yet another embodiment at least about 25 percent by weight, and in one embodiment no more than about 90 percent by weight, in another embodiment no more than about 80 percent by weight, and in yet another embodiment no more than about 75 percent by weight, although the amount can be outside of these ranges.

The properties and features of the oxazoline compounds of the present disclosure include, for example, sharp-melting temperatures that are within the 50-120° C. range, large viscosity change ($>10^5$ cPs) during a narrow temperature range for crystallization (which can lie anywhere in the range of from about 50° C. to about 110° C.), higher polarity compounds that allow for easier blending with commonly available colorants, dispersants and other functional additives, and facile, low-cost synthesis by standard neat condensation reactions (a solvent-less process with water as the only by-product). Examples of suitable crystalline oxazoline compounds, including mono-oxazoline compounds and ester derivatives, are provided in Table 1 (with their physical properties and functions in the phase change ink composition).

TABLE 1

| No. | Ink Component | $T_{melt}$* (°C.) (DSC) | $T_{cryst}$* (°C.) (DSC) | $T_{cryst}$ (°C.) (Rheology) |
|---|---|---|---|---|
| 1 | (structure: oxazoline with two CH₂OH groups and (CH₂)₁₆CH₃ chain) | 107 | 85.5 | 102 |
| 2 | (structure: oxazoline with two CH₂OH groups and long alkyl chain) | 108.6 | 92 | 108 |
| 3 | (structure: oxazoline with two CH₂OH groups and (CH₂)₁₀CH₃ chain) | 97 | 73 | 97 |
| 4 | (structure: oxazoline ester with (CH₂)₁₆CH₃ groups) | 60 | 45 | N/A |

TABLE 1-continued
| No. | Ink Component | $T_{melt}$ (°C.) (DSC) | $T_{cryst}$ (°C.) (DSC) | $T_{cryst}$ (°C.) (Rheology) |
|---|---|---|---|---|
| 5 | 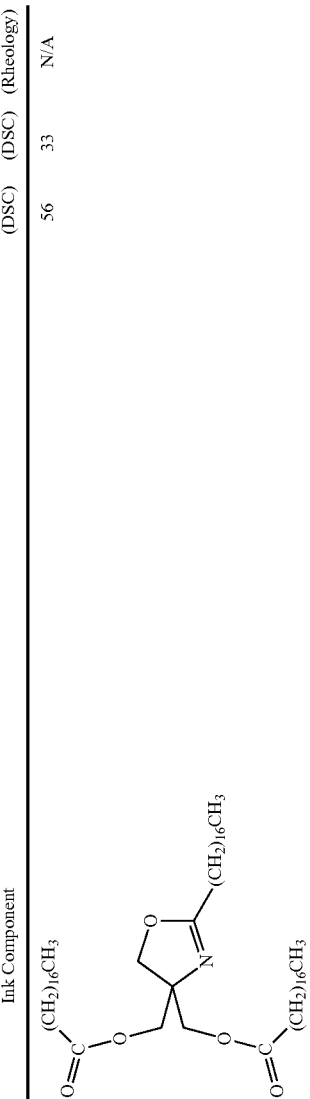 | 56 | 33 | N/A |
| 6 | 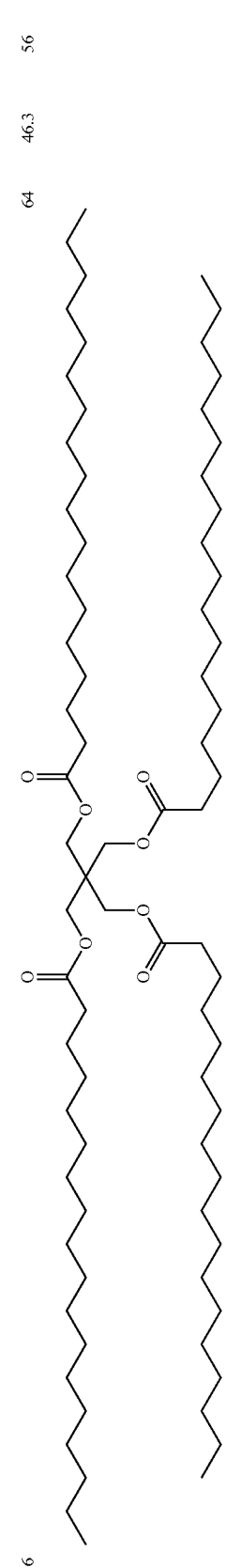 | 64 | 46.3 | 56 |
| 7 |  | 49.3, 57.0 | 52, 46.5 | 61 |
R = 
* The samples were measured on a Q1000 Differential Scanning Calorimeter (TA Instruments) at a rate of 10° C./min from −50° C. to 200° C. to −50° C.; midpoint values are quoted.
N/A = not available The amorphous component in the solid phase change ink provides tackiness to help bind together the crystalline phase change component with other optional ink additives. Further, the amorphous component imparts robustness to the printed ink.

In embodiments, the amorphous component is one or more compounds that is a derivative of a polyol compound having two or more hydroxyl groups, or more specifically, a derivative of a polyalcohol compound having from 2 to 20 hydroxyl groups. In embodiments, the polyol (polyalcohol) compound can have from 2 to about 50 carbons, or from about 4 to about 40 carbons or from about 5 to about 36 carbons, and which may have alkyl, aryl, or alkylaryl carbon-containing groups. In embodiments, the alkyl portion of the polyol compound may be linear, cyclic, or branched and have ethylenically unsaturated groups. The polyol compound may also contain heteroatoms such as O, N, S, P, B, Si along with the carbon atoms.

In embodiments, the amorphous component is one or more compounds that is a derivative of a polyol compound having two or more hydroxyl groups, or more specifically, a derivative of a polyalcohol compound having from 2 to 20 hydroxyl groups. In embodiments, the polyol (polyalcohol) compound can have from 2 to about 50 carbons, or from about 4 to about 40 carbons or from about 5 to about 36 carbons, and which may have alkyl, aryl, or alkylaryl carbon-containing groups. In embodiments, the alkyl portion of the polyol compound may be linear, cyclic, or branched and have ethylenically unsaturated groups. The polyol compound may also contain heteroatoms such as O, N, S, P, B, Si along with the carbon atoms.

In further embodiments, the one or more amorphous components is an ester derivative of a polyol, wherein the ester group can be derived from a simple monofunctional carboxylic acid, difunctional carboxylic acids, or can be an oligomeric or polymeric ester group derived from difunctional and polyfunctional acids, and mixtures thereof. The carboxylic mono-acids and di-acids can be aromatic having from 6 to about 14 carbons, or aliphatic acids having from about 2 to about 50 carbons, or alkylaromatic acids having from 6 to about 25 carbons. The aliphatic portion of the mono-carboxylic and di-carboxylic acids can be either linear, branched, cyclic and/or ethylenically unsaturated alkyl group.

In the present embodiments, desirable amorphous materials have relatively low viscosity ($<10^2$ cPs, or from about 20 to about 2000 cPs, or from about 30 to about 1500 cPs) at about 140° C., but very high viscosity ($>10^6$ cPs) at temperatures less than about 60° C. The lower viscosity at 140° C. provides high formulation latitude to enable inkjet printing while the high viscosity at room temperature imparts robustness for the printed image. The amorphous materials have $T_g$ (glass transition temperatures) but do not exhibit crystallization and melting peaks by DSC (measured at 10° C./min from −50 to 200 to −50° C.). The $T_g$ values are typically from about −10° C. to about 50° C., or from about −5° C. to about 45° C., or from about 0° C. to about 40° C., to impart the desired toughness and flexibility to the inks.

Representative examples of suitable amorphous components are illustrated in Table 2. Compound 11 of Table 2 is a polymeric ester prepared from succinic acid and isosorbide, a naturally derived polypol compound isolable from plant sugars and starch, such as corn and wheat. Isosorbide is generally represented with the formula

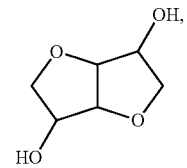

and reacts with diacids of the formula HOOC—R'—COOH to form oligomers of the formula

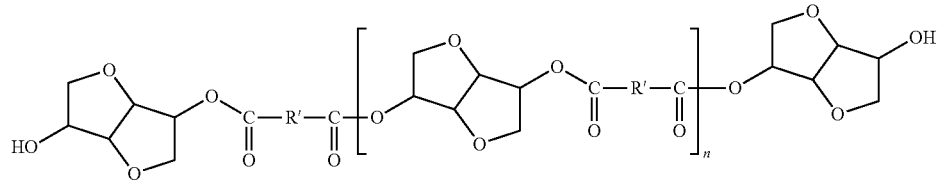

suitable for including in the inks disclosed herein, wherein n is an integer of in one embodiment at least about 2, and in another embodiment at least about 3, and in one embodiment no more than about 10, and in another embodiment no more than about 8, although the value of n can be outside of these ranges, and R" is (1) an alkylene group, including linear, branched, saturated, unsaturated, cyclic, substituted, and unsubstituted alkylene groups, and wherein hetero atoms, such as oxygen, nitrogen, sulfur, silicon, phosphorus, boron, and the like either may or may not be present in the alkylene group, in one embodiment with at least about 2 carbon atoms, and in one embodiment with no more than about 10 carbon atoms, although the number of carbon atoms can be outside of these ranges, (2) an arylene group, including substituted and unsubstituted arylene groups, and wherein hetero atoms, such as oxygen, nitrogen, sulfur, silicon, phosphorus, boron, and the like either may or may not be present in the arylene group, in one embodiment with at least about 6 carbon atoms, in another embodiment with at least about 7 carbon atoms, and in yet another embodiment with at least about 8 carbon atoms, and in one embodiment with no more than about 20 carbon atoms, in another embodiment with no more than about 18 carbon atoms, and in yet another embodiment with no more than about 16 carbon atoms, although the number of carbon atoms can be outside of these ranges, such as phenylene or the like, (3) an arylalkylene group, including substituted and unsubstituted arylalkylene groups, wherein the alkyl portion of the arylalkylene group can be linear, branched, saturated, unsaturated, and/or cyclic, and wherein hetero atoms, such as oxygen, nitrogen, sulfur, silicon, phosphorus, boron, and the like either may or may not be present in either or both of the alkyl portion and the aryl portion of the arylalkylene group, in one embodiment with at least about 7 carbon atoms, and in one embodiment with no more than about 20 carbon atoms, in another embodiment with no more than about 18 carbon atoms, and in yet another embodiment with no more than about 16 carbon atoms, although the number of carbon atoms can be outside of these ranges, such as benzylene or the like, or (4) an alkylarylene group, including substituted and unsubstituted alkylarylene groups, wherein the alkyl portion of the alkylarylene group can be linear, branched, saturated, unsaturated, and/or cyclic, and wherein hetero atoms, such as oxygen, nitrogen, sulfur, silicon, phosphorus, boron, and the like either may or may not be present in either or both of the alkyl portion and the aryl portion of the alkylarylene group, in one embodiment with at least about 7 carbon atoms, and in one embodiment with no more than about 20 carbon atoms, in another embodiment with no more than about 18 carbon atoms, and in yet another embodiment with no more than about 16 carbon atoms, although the number of carbon atoms can be outside of these ranges, such as tolylene or the like, and wherein the substituents on the substituents on the substituted alkylene, arylene, arylalkylene, and alkylarylene groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring.

In one specific embodiment, the diacid is selected to be derived from a bio-based or renewable resource. Examples of suitable bio-based diacids include, but are not limited to, succinic acid, itaconic acid, azelaic acid, and the like, which are derived from agricultural and forestry sources.

TABLE 2

| No. | Ink Component | $T_g$ or $T_{cryst}$ if applicable, (° C.) (DSC) * | η @ 130° C. (cPs) ** | η @ 60° C. (cPs) ** | Function in Solid Ink |
| --- | --- | --- | --- | --- | --- |
| 8 | 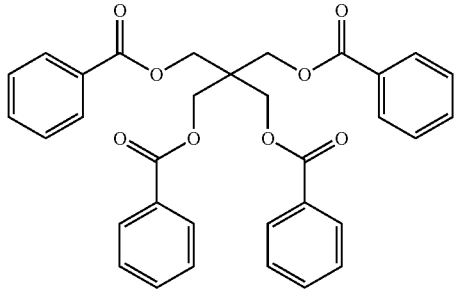 [SMILES: O=C(OCC(COC(=O)c1ccccc1)(COC(=O)c1ccccc1)COC(=O)c1ccccc1)c1ccccc1] | $T_{melt}$ ~104 No crystallization event | 43 | $3.6 \times 10^4$ | Amorphous binder |
| 9 | 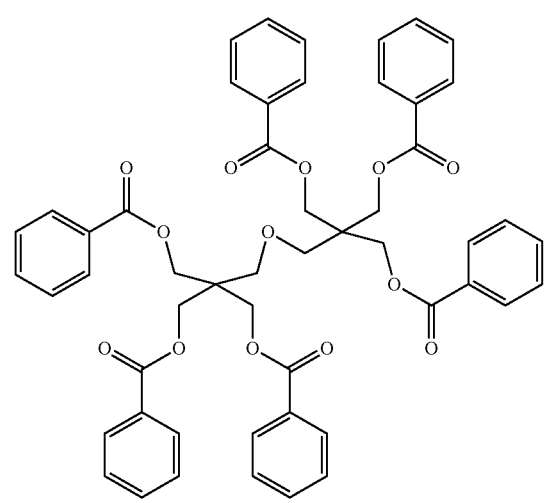 [SMILES: O=C(OCC(COCC(COC(=O)c1ccccc1)(COC(=O)c1ccccc1)COC(=O)c1ccccc1)(COC(=O)c1ccccc1)COC(=O)c1ccccc1)c1ccccc1] | N/A | N/A | N/A | Amorphous binder |

TABLE 2-continued

| No. | Ink Component | $T_g$ or $T_{cryst}$ if applicable, (°C.) (DSC) * | $\eta$ @ 130° C. (cPs) ** | $\eta$ @ 60° C. (cPs) ** | Function in Solid Ink |
|---|---|---|---|---|---|
| 10 | [structure] | Tg (onset) 56.5 | 3,662 | $4.9 \times 10^6$ (@ 90° C.) | Amorphous binder |
| 11 | [structure] | Tg (onset) 31.6 | 516 | $7.3 \times 10^5$ | Amorphous binder |

\* The samples were measured on a Q1000 Differential Scanning Calorimeter (TA Instruments) at a rate of 10° C./min from −50° C. to 200° C. to −50° C.; midpoint values are quoted.
\*\* Compounds were measured on a Rheometrics RFS3 strain-controlled rheometer (TA instruments) equipped with a Peltier heating plate and using a 25 mm parallel plate geometry tool. The method used was a temperature sweep starting from about 140° C. to about 40° C. in temperature steps of 5° C., a soak (equilibration) time of 75 seconds between each temperature and measured at a constant frequency of 1 Hz.
N/A = not available An additional feature of the novel solid ink compositions of the present embodiments is that some components are bio-based, safe, and inexpensive materials commonly used as food additives or for personal care applications. Examples of bio-based components include Nos. 1, 3, 6, 7, 10 and 11 in Tables 1 and 2 above.

In embodiments, the substituted oxazoline compounds and/or substituted oxazoline derivatives of the present disclosure may be incorporated into colored or non-colored (or colorless) phase-change ink compositions that include from about 0 to about 30 percent, or from about 1 to about 20 percent, or from about 2 to about 15 percent by weight of dye or pigment. In embodiments, the substituted oxazoline compounds and/or substituted oxazoline derivatives may be present in an amount of from about 1 to about 100 percent, or from about 25 to about 98 percent, or from about 50 to about 97 percent by weight of the phase-change ink composition.

Ink Compositions

In specific embodiments, the weight ratio of the crystalline components to amorphous components is from about 50:50 to about 95:5, or is from about 55:45 to about 90:10. In one embodiment, the weight ratio is about 65:35 for the crystalline and amorphous components, respectively. In another embodiment, the weight ratio is about 75:25 for the crystalline and amorphous components, respectively.

The one or more crystalline components in the ink formulation is responsible for the phase change by rapid crystallization upon cooling. The one or more crystalline components also sets up the structure of the final ink film and creates a hard ink by reducing the tackiness of the one or more amorphous component. The crystalline components exhibit crystallization, relatively low viscosity ($\eta$) at 140° C. of less than about 15 centipoise (cPs), or from about 0.5 to about 15, or from about 1 to about 13 cPs, and high viscosity ($>10^6$ cPs.) at room temperature. Because the crystalline components dictate the phase change of the ink, rapid crystallization is required to allow further immediate print processes if required (i.e., ink spreading, duplex printing, etc.) and more importantly to prevent excessive showthrough on uncoated substrates. By differential scanning calorimetry analysis (DSC) (using typical analysis method of 10° C./min from −50 to 200 to −50° C.), desirable crystalline components show sharp crystallization and melting peaks, and the $\Delta T$ ($T_{melt}$-$T_{crys}$) between them is less than 50° C. The melting point must be below 150° C., which is the upper limit of the jetting temperature, or preferably below from about 145 to about 140° C. The melting point is preferably above 65° C. to prevent blocking and offset print transfer upon standing at temperatures up to 65° C., or more preferably above about 66 or above about 67° C. In specific embodiments, the melting point from about 65 to about 130° C.

In embodiments, the crystalline component is present in an amount of from about 60 percent to about 95 percent by weight of the total weight of the solid ink composition. In embodiments, the amorphous binder comprises from about 5 to about 50 percent, or from about 7 to about 40 percent, or from about 10 to about 35 percent by weight of the ink composition. In further embodiments, the solid ink composition may include a colorant, such as a pigment or dye, and one or more additives, such as compatibilizers or viscosity modifiers, as further discussed below.

In embodiments, the phase change inks can be solid inks which have melting points of from about 60° C. to about 130° C., for example from about 65° C. to about 120° C., from about 70° C. to about 115° C., as determined by, for example, by differential scanning calorimetry. In embodiments, the phase change ink has a crystallization point of from about 50° C. to about 120° C., or from about 60 to about 115° C., or from about 65 to about 110° C.

In further embodiments, the phase change inks can have a complex viscosity in the molten state, such as for example temperatures above 130° C. in the range of from about 1 to about 20 cPs (centipoise, or mPa-sec), or from about 2 to about 18 cPs, or from about 3 to about 15 cPs. The complex viscosities of the phase change ink can be measured at a range of frequencies, such as from about 1 Hz to about 50 Hz. At room temperature, the phase change ink can have a complex viscosity of about $\geq 1 \times 10^6$ cPs, or more specifically, from about $5 \times 10^5$ to about $1 \times 10^9$ cPs.

The solid ink composition of the present embodiments exhibits a phase change transition from a liquid to a solid within a temperature change of about 20° C., or more specifically, from about 5° C. to about 30° C. In embodiments, the solid ink composition has a phase transition at a temperature between about 45 and about 130° C. or between about 65 to about 120° C. The solid ink composition of the present embodiments have a viscosity of less than about 20 cps at about 140° C. and a viscosity of at least about $10^6$ cps at a temperature between about 20 and about 35° C., or in more specific embodiments, a viscosity of from about 2 to about 18 cPs at about 140° C. and a viscosity of from about $10^6$ to about $10^9$ cPs at a temperature between about 20 and about 35° C.

The ink of embodiments may further include conventional additives to take advantage of the known functionality associated with such conventional additives. Such additives may include, for example, at least one antioxidant, defoamer, slip and leveling agents, clarifiers, viscosity modifiers, compatibilizers, synergists, rheology modifiers, adhesive or tackifiers, plasticizers, mixtures thereof and the like.

The compositions of embodiments, which may be incorporated into ink(s) or coatings, may further include conventional additives to take advantage of the known functionality associated with such additives. Such optional additives may include, for example, an antioxidant, defoamer, UV absorber, slip and leveling agents, synergists, adjuvants, clarifier, tackifier, adhesive, plasticizer and the like.

In embodiments, the ink may optionally contain antioxidants to protect the images from oxidation and also may protect the ink components from oxidation while existing as a heated melt in the ink reservoir. Examples of suitable antioxidants include (1) N,N'-hexamethylene bis(3,5-di-tert-butyl-4-hydroxy hydrocinnamamido) (IRGANOX 1098, available from Ciba Inc.), (2) 2,2-bis(4-(2-(3,5-di-tert-butyl-4-hydroxyhydrocinnamoyloxy))ethoxyphenyl) propane (TOPANOL-205, available from ICI America Corporation), (3) tris(4-tert-butyl-3-hydroxy-2,6-dimethyl benzyl) isocyanurate (CYANOX 1790, 41,322-4, LTDP, Aldrich D12, 840-6), (4) 2,2'-ethylidene bis(4,6-di-tert-butylphenyl) fluoro phosphonite (ETHANOX-398, available from Ethyl Corporation), (5) tetrakis(2,4-di-tert-butylphenyl)-4,4'-biphenyl diphosphonate (ALDRICH 46, 852-5; hardness value 90), (6) pentaerythritol tetrastearate (TCI America #P0739), (7) tributylammonium hypophosphite (Aldrich 42,009-3), (8) 2,6-di-tert-butyl-4-methoxyphenol (Aldrich 25, 106-2), (9) 2,4-di-tert-butyl-6-(4-methoxybenzyl)phenol (Aldrich 23,008-1), (10) 4-bromo-2,6-dimethylphenol (Aldrich 34, 951-8), (11) 4-bromo-3,5-didimethylphenol (Aldrich B6, 420-2), (12) 4-bromo-2-nitrophenol (Aldrich 30, 987-7), (13) 4-(diethyl aminomethyl)-2,5-dimethylphenol (Aldrich 14, 668-4), (14) 3-dimethylaminophenol (Aldrich D14.400-2), (15) 2-amino-4-tert-amylphenol (Aldrich 41, 258-9), (16) 2,6-bis(hydroxymethyl)-p-cresol (Aldrich 22, 752-8), (17) 2,2'-methyl-enediphenol (Aldrich B4, 680-8), (18) 5-(diethylamino)-2-nitrosophenol (Aldrich 26, 951-4), (19) 2,6-dichloro-4-fluorophenol (Aldrich 28, 435-1), (20) 2,6-dibromo fluoro phenol (Aldrich 26,003-7), (21) α-trifluoro-o-creso-I (Aldrich 21, 979-7), (22) 2-bromo-4-fluorophenol (Aldrich 30, 246-5), (23) 4-fluorophenol (Aldrich F1, 320-7), (24) 4-chlorophenyl-2-chloro-1,1,2-tri-fluoroethyl sulfone (Aldrich 13, 823-1), (25) 3,4-difluoro phenylacetic acid (Aldrich 29,043-2), (26) 3-fluorophenylacetic acid (Aldrich 24, 804-5), (27) 3,5-difluoro phenylacetic acid (Aldrich 29,044-0), (28) 2-fluorophenylacetic acid (Aldrich 20, 894-9), (29) 2,5-bis(trifluoromethyl)benzoic acid (Aldrich 32, 527-9), (30) ethyl-2-(4-(4-(trifluoromethyl)phenoxy)phenoxy) propionate (Aldrich 25,074-0), (31) tetrakis (2,4-di-tert-butyl phenyl)-4,4'-biphenyl diphosphonate (Aldrich 46, 852-5), (32) 4-tert-amyl phenol (Aldrich 15, 384-2), (33) 3-(2H-benzotriazol-2-yl)-4-hydroxy phenethylalcohol (Aldrich 43,071-4), NAUGARD 76, NAUGARD 445, NAUGARD 512, AND NAUGARD 524 (manufactured by Chemtura Corporation), and the like, as well as mixtures thereof. The antioxidant, when present, may be present in the ink in any desired or effective amount, such as from about 0.25 percent to about 10 percent by weight of the ink or from about 1 percent to about 5 percent by weight of the ink.

The ink may further contain an optional tackifier such as the commercial derivatives of rosin acids derived from gum rosins or tail oil resins. Representative examples include, but are not limited to, a glycerol ester of hydrogenated abietic (rosin) acid such as FORAL 85 (commercially available from Eastman), or a pentaerythritol ester of hydroabietic (rosin) acid such as FORAL 105 (commercially available from Eastman), or CELLOLYN 21, a hydroabietic (rosin) alcohol ester of phthalic acid (commercially available from Eastman), or triglycerides of hydrogenated abietic (rosin) acid such as KE-311 and KE-100 resins, (commercially available from Arakawa Chemical industries, Ltd.), synthetic polyterpene resins such as NEVTAC 2300, NEVTAC 100, and NEVTACO 80 (commercially available from Neville Chemical Company), WINGTACK 86, a modified synthetic polyterpene resin (commercially available from Sartomer), and the like. Tackifiers may be present in the ink in any effective amount, such as from about 0.01 percent by weight of the ink to from about 30 percent by weight of the ink, from about 0.1 percent by weight of the ink to about 25 percent by weight of the ink, from about 1 weight percent of the ink to about 20 weight percent of the ink.

Plasticizers such as UNIPLEX 250 (commercially available from Unitex), the phthalate ester plasticizers commercially available from Ferro under the trade name SANTICIZER, such as dioctyl phthalate, diundecyl phthalate, alkylbenzyl phthalate (SANTICIZER 278), triphenyl phosphate (commercially available from Ferro), KP-140, a tributoxyethyl phosphate (commercially available from Great Lakes Chemical Corporation), MORFLEX 150, a dicyclohexyl phthalate (commercially available from Morflex Chemical Company Inc.), trioctyl trimellitate (commercially available from Sigma Aldrich Co.), and the like. Plasticizers may be present in an amount from about 0.01 to about 30 percent, from about 0.1 to about 25 percent, from about 1 to about 20 percent by weight of the ink.

In embodiments, the ink compositions described herein also includes at least one colorant. Any desired or effective colorant can be employed in the ink compositions, including dyes, pigments, mixtures thereof, and the like, provided that the colorant can be dissolved or dispersed in the ink carrier. Any dye or pigment may be chosen, provided that it is capable of being dispersed or dissolved in the ink carrier and is compatible with the other ink components. The ink compositions can be used in combination with conventional ink colorant materials, such as Color Index (C.I.) Solvent Dyes, Disperse Dyes, modified Acid and Direct Dyes, Basic Dyes, Sulphur Dyes, Vat Dyes, and the like. Examples of suitable dyes include Neozapon Red 492 (BASF); Orasol Red G (Ciba); Direct Brilliant Pink B (Oriental Giant Dyes); Direct Red 3BL (Classic Dyestuffs); Supranol Brilliant Red 3BW (Bayer AG); Lemon Yellow 6G (United Chemie); Light Fast Yellow 3G (Shaanxi); Aizen Spilon Yellow C-GNH (Hodogaya Chemical); Bernachrome Yellow GD Sub (Classic Dyestuffs); Cartasol Brilliant Yellow 4GF (Clariant); Cibanon Yellow 2GN (Ciba); Orasol Black CN (Ciba); Savinyl Black RLSN (Clariant); Pyrazol Black BG (Clariant); Morfast Black 101 (Rohm & Haas); Diaazol Black RN (ICI); Orasol Blue GN (Ciba); Savinyl Blue GLS (Clariant); Luxol Fast Blue MBSN (Pylam Products); Sevron Blue 5GMF (Classic Dyestuffs); Basacid Blue 750 (BASF), Neozapon Black X51 (BASF), Classic Solvent Black 7 (Classic Dyestuffs), Sudan Blue 670 (C.I. 61554) (BASF), Sudan Yellow 146 (C.I. 12700) (BASF), Sudan Red 462 (C.I. 26050) (BASF), C.I. Disperse Yellow 238, Neptune Red Base NB543 (BASF, C.I. Solvent Red 49), Neopen Blue FF-4012 from BASF, Lampronol Black BR from ICI (C.I. Solvent Black 35), Morton Morplas Magenta 36 (C.I. Solvent Red 172), metal phthalocyanine colorants such as those disclosed in U.S. Pat. No. 6,221,137, the disclosure of which is totally incorporated herein by reference, and the like. Other suitable dyes include those disclosed in U.S. Patent Application Publication No. 2010/0086683 and U.S. Pat. Nos. 7,732,581; 7,381,831; 6,713,614; 6,646,111; 6,590,082; 6,472,523; 6,713,614; 6,958,406; 6,998,493; 7,211,131; and 7,294,730, each of which is incorporated herein by reference in its entirety. Polymeric dyes can also be used, such as those disclosed in, for example, U.S. Pat. No. 5,621,022 and U.S. Pat. No. 5,231,135, the disclosures of each of which are herein entirely incorporated herein by reference, and commercially available from, for example, Milliken & Company as Milliken Ink Yellow 869, Milliken Ink Blue 92, Milliken Ink Red 357, Milliken Ink Yellow 1800, Milliken Ink Black 8915-67, uncut Reactant Orange X-38, uncut Reactant Blue X-17, Solvent Yellow 162, Acid Red 52, Solvent Blue 44, and uncut Reactant Violet X-80.

In embodiments, solvent dyes are employed. Examples of suitable solvent dyes include Neozapon Red 492 (BASF); Orasol Red G (Ciba); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow CGP (Ciba); Orasol Black RLP (Ciba); Savinyl Black RLS (Clariant); Morfast Black Conc. A (Rohm and Haas); Orasol Blue GN (Ciba); Savinyl Blue GLS (Sandoz); Luxol Fast Blue MBSN (Pylam); Sevron Blue 5GMF (Classic Dyestuffs); Basacid Blue 750 (BASF), Neozapon Black X51 [C.I. Solvent Black, C.I. 12195] (BASF), Sudan Blue 670 [C.I. 61554] (BASF), Sudan Yellow 146 [C.I. 12700] (BASF), Sudan Red 462 [C.I. 260501] (BASF), mixtures thereof and the like.

Pigments are also suitable colorants for the ink composition described herein. Examples of suitable pigments include PALIOGEN Violet 5100 (commercially available from BASF); PALIOGEN Violet 5890 (commercially available from BASF); HELIOGEN Green L8730 (commercially available from BASF); LITHOL Scarlet D3700 (commercially available from BASF); SUNFAST Blue 15:4 (commercially available from Sun Chemical); Hostaperm Blue B2G-D (commercially available from Clariant); Hostaperm Blue B4G (commercially available from Clariant); Permanent Red P-F7RK; Hostaperm Violet BL (commercially available from Clariant); LITHOL Scarlet 4440 (commercially available from BASF); Bon Red C (commercially available from Dominion Color Company); ORACET Pink RF (commercially available from Ciba); PALIOGEN Red 3871K (commercially available from BASF); SUNFAST Blue 15:3 (commercially available from Sun Chemical); PALIOGEN Red 3340 (commercially available from BASF); SUNFAST Carbazole Violet 23 (commercially available from Sun Chemical); LITHOL Fast Scarlet L4300 (commercially available from BASF); SUNBRITE Yellow 17 (commercially available from Sun Chemical); HELIOGEN Blue L6900, L7020 (commercially available from BASF); SUNBRITE Yellow 74 (commercially available from Sun Chemical); SPECTRA PAC C Orange 16 (commercially available from Sun Chemical); HELIOGEN Blue K6902, K6910 (commercially available from BASF); SUNFAST Magenta 122 (commercially available from Sun Chemical); HELIOGEN Blue D6840, D7080 (commercially available from BASF); Sudan Blue OS (commercially available from BASF); NEOPEN Blue FF4012 (commercially available from BASF); PV Fast Blue B2GO1 (commercially available from Clariant); IRGALITE Blue BOA (commercially available from Ciba); PALIOGEN Blue 6470 (commercially available from BASF); Sudan Orange G (commercially available from Aldrich), Sudan Orange 220 (commercially available from BASF); PALIOGEN Orange 3040 (BASF); PALIOGEN Yellow 152, 1560 (commercially available from BASF); LITHOL Fast Yellow 0991K (commercially available from BASF); PALIOTOL Yellow 1840 (commercially available from BASF); NOVOPERM Yellow FGL (commercially available from Clariant); Ink Jet Yellow 4G VP2532 (commercially available from Clariant); Toner Yellow HG (commercially available from Clariant); Lumogen Yellow 00790 (commercially available from BASF); Suco-Yellow L1250 (commercially available from BASF); Suco-Yellow D1355 (commercially available from BASF); Suco Fast Yellow DI 355, D1351 (commercially available from BASF); HOSTAPERM Pink E 02 (commercially available from Clariant); Hansa Brilliant Yellow 5GX03 (commercially available from Clariant); Permanent Yellow GRL 02 (commercially available from Clariant); Permanent Rubine L6B 05 (commercially available from Clariant); FANAL Pink D4830 (commercially available from BASF); CINQUASIA Magenta (commercially available from DU PONT); PALIOGEN Black L0084 (commercially available from BASF); Pigment Black K801 (commercially available from BASF); and carbon blacks such as REGAL 330™ (commercially available from Cabot), Nipex 150 (commercially available from Degusssa) Carbon Black 5250 and Carbon Black 5750 (commercially available from Columbia Chemical), and the like, as well as mixtures thereof. Other suitable pigments include those disclosed in U.S. Pat. Nos. 7,905,954; 7,503,973; 7,465,348; and 7,427,323.

The ink may also contain one or more dispersants and/or one or more surfactants for their known properties, such as for controlling wetting properties of the pigments in the ink composition. Examples of suitable additives that may be used in embodiments include, but are not limited to, BYK-UV 3500, BYK-UV 3510 (BYK-Chemie); Dow Corning 18, 27, 57, 67 Additives; ZONYL FSO 100 (DuPont); MODAFLOW 2100 (Solutia); Foam Blast 20F, 30, 550 (Lubrizol); EFKA-1101, -4046, -4047, -2025, -2035, -2040, -2021, -3600, -3232; SOLSPERSE 13000, 13240, 17000, 19200, 20000, 34750, 36000, 39000, 41000, 54000, individual dispersants or combinations may optionally be used with synergists including SOLSPERSE 5000, 12000, 22000 (Lubrizol); DISPERBYK-108, -163, -167, 182 (BYK-Chemie); K-SPERSE 132, XD-A503, XD-A505 (King Industries).

When present, the optional additives may each, or in combination, be present in the ink in any desired or effective amount, such as from about 0.1 to about 15 percent or from about 0.5 to about 12 percent by weight of the ink.

The amount of colorant in the phase-change ink of the present disclosure, may be from about 0.5 percent to about 20 percent or from about 1 percent to about 15 percent by weight, or from about 2 percent to about 10 percent by weight of the ink composition.

The ink compositions can be prepared by any desired or suitable method. For example, each of the components of the ink carrier can be mixed together, followed by heating, the mixture to at least its melting point, for example from about 60 to about 150° C., such as from about 80 to about 140° C., or from about 85 to about 120° C. The colorant may be added before the ink ingredients have been heated or after the ink ingredients have been heated. The molten mixture may optionally be subjected to grinding in an attritor, bail mill ore media mill apparatus, or to high shear mixing, in order to effect dispersion of the colorant in the ink carrier. The heated mixture is then stirred to obtain a uniform molten ink, followed by cooling the ink to ambient temperature (typically from about 20° C. to about 25° C.). The inks are solid at ambient temperature.

The hardness of the phase change ink is a characteristic that can serve as an indicator of ink robustness on the printed image (for example, resistance to abrasion, folding creases, and the like). The ink hardness can be measured using a needle penetrometer apparatus, such as the PTC® Durometer Model PS 6400-0-29001 (available from Pacific Transducer Corp., USA) equipped with a Model 476 Stand with standard 1 Kg load, in this Durometer apparatus, a sharp tip (or needle) that is mounted within a retractable post is pressed against the surface of a molded sample of ink. The degree of resistance to the needle tip upon pushing down on the ink surface is measured and correlated to the distance by which the needle tip has retracted backward into the mounting post. A measured value of 100 would indicate a perfectly hard and impermeable surface (such as glass).

The inks disclosed herein have hardness values, measured at about 25° C. using the FTC® Durometer, of in one embodiment at least about 60, in another embodiment at least about 65, and in yet another embodiment at least about 70, although the value can be outside of these ranges.

The phase-changes inks of this disclosure can be printed onto paper substrates by any suitable method. The K-proofer apparatus is a useful printing tool to screen a variety of inks at small scale and to assess image quality and/or coloristic properties on various substrates, before an ink formulation is scaled up and optimized for more in-depth printing tests. In embodiments, the phase change inks were printed onto Xerox® Digital Color Elite Gloss (DCEG) coated papers (120 gsm stock) using a "K-proofer" gravure printing apparatus (obtained from Testing Machines Incorporated, New Castle, Del., USA), which was equipped with a "type B" single wedge gravure plate having 150 lines/inch (60 lines/cm) and three 100%-80%-60% density zones on the plate. The gravure plate temperature was set at 142° C. (actual plate temperature is ~135±1° C.) and the pressure roller set at low pressure.

Image robustness of ink prints can be evaluated using a scratch (or abrasion) tester. Two different scratch tests were performed on the inks disclosed in embodiments, which are the "coin" scratch test and the "gouge finger" test. The "coin" scratch test evaluates how much ink, or toner, is removed from printed coating or image after a beveled-edge circular tool (referred to as the "coin" tip) is run across the surface. The instrument used for this test is a modified Taber Industries Linear Abraser (Model 5700) with a custom "coin" scratch tip that weighs 100 grams, which when lowered onto the test print sample, is then scratched across the print surface for either 3 cycles or 9 cycles at a frequency of 25 cycles/minute. A two inch long scratch is examined to characterize the amount of ink or toner material removed from the print sample, by first scanning along the scratch length using a flat bed scanner, and then performing image analysis with software that counts the area of paper substrate that is visible, and compares it to the original amount of ink in the scratched area.

Another scratch test tool is called the "gouge finger" tester, which is a custom apparatus equipped with three separate sharp, finger-like tips that are dragged across the ink print sample. Different force loads are applied to the three fingers, labelled as "Heavy", "Medium" and "Light" force loads. The prints prepared with the phase change inks disclosed herein were scratch-tested using only the medium and heavy load gouge finger tools, as these are considered stress test conditions. For each gouge finger tip, a single scratch that runs down the length of the print sample is conducted at constant speed setting. The scratched area of the print sample is then examined to characterize the amount of ink or toner material removed from the print sample, in the same manner as done for the "coin" scratch tester described above. Commercial image analysis software converts the pixel count to a unit-less measurement CA (crease area). White areas in the scratch zone (i.e. areas where ink has been removed from the substrate by the scratch tip) are counted. Higher pixel counts correspond to more ink being removed from the print and showing more damage. A perfect non-scratched ink print would have no material being removed and therefore would have very low pixel count (and CA) approaching zero.

The data in Table 3 shows the CA values (which are directly proportional to pixel count) for the scratched areas of the K-proof ink prints, generated by the coin scratch test. Crease Area (CA) values are obtained from coin scratch test for K-proof prints of Example Inks 1, 4 and 6 and Comparative Ink (Xerox Phase Cyan solid ink). While there is inevitably some variation in the data due to threshold limits of the image analysis for the scratch areas, the relative CA data show that three of the Example Inks, prepared with oxazoline crystalline components and amorphous polyol ester resins, all demonstrated significantly better scratch resistance than the Comparative Ink (Xerox Phaser Cyan solid ink).

TABLE 3

| Ink | Test # | Coin Scratch (3 Cycles) | Coin Scratch (9 cycles) |
| --- | --- | --- | --- |
| Comparative Ink 1 | 1 | 62.33 | 113.46 |
| | 2 | 57.74 | 85.58 |
| | Mean | 60.04 | 99.52 |
| Example Ink 1 | 1 | 7.67 | 19.39 |
| | 2 | 2.19 | 7.69 |
| | Mean | 4.93 | 13.54 |
| Example Ink 4 | 1 | 17.16 | 65.84 |
| | 2 | 11.33 | 56.51 |
| | Mean | 14.25 | 61.18 |

TABLE 3-continued

| Ink | Test # | Coin Scratch (3 Cycles) | Coin Scratch (9 cycles) |
|---|---|---|---|
| Example Ink 6 | 1 | 13.18 | 4.89 |
|  | 2 | 0.26 | 3.63 |
|  | Mean | 6.72 | 4.26 |

The inks can be employed in an apparatus for ink jet printing processes either directly to paper, or indirectly to an intermediate transfer member. Examples of apparatuses that are suitable for printing the phase-change inks described herein include apparatuses comprised of at least one thermally controlled ink retaining reservoir to store or hold molten phase-change ink, an ink jet head for printing the ink, and an ink supply line for providing the phase-change ink to the ink jet head.

Another embodiment disclosed herein is directed to a process which comprises incorporating an ink as disclosed herein into an ink jet printing apparatus, melting the ink, and causing droplets of the melted ink to be ejected in an imagewise pattern onto a recording substrate. Known direct printing process may be suitable for applying the ink compositions of the present disclosure onto a substrate.

Yet another embodiment disclosed herein is directed to a process which comprises incorporating an ink as disclosed herein into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. In another specific embodiment, both the intermediate transfer member and the final recording sheet are heated; in this embodiment, both the intermediate transfer member and the final recording sheet are heated to a temperature below that of the melted ink in the printing apparatus; in this embodiment, the relative temperatures of the intermediate transfer member and the final recording sheet can be (1) the intermediate transfer member is heated to a temperature above that of the final recording substrate and below that of the melted ink in the printing apparatus; (2) the final recording substrate is heated to a temperature above that of the intermediate transfer member and below that of the melted ink in the printing apparatus; or (3) the intermediate transfer member and the final recording sheet are heated to approximately the same temperature. An offset or indirect printing process is also disclosed in, for example, U.S. Pat. No. 5,389,958, the disclosure of which is incorporated herein by reference. In one specific embodiment, the printing apparatus employs a piezoelectric printing process wherein droplets of the ink are caused to be ejected in imagewise pattern by oscillations of piezoelectric vibrating elements. Inks as disclosed herein can also be employed in other hot melt printing processes, such as hot melt acoustic ink jet printing, hot melt thermal ink jet printing, hot melt continuous stream or deflection ink jet printing, and the like. Phase-change inks as disclosed herein can also be used in printing processes other than hot melt ink jet printing processes, such as hot-melt lithographic, flexographic, and related offset ink printing processes.

Any suitable substrate or recording sheet can be employed such as plain paper, coated paper stocks and heavy paper stocks, transparency materials, fabrics, textile products, plastics, flexible polymeric films, inorganic substrates such as metals or silicon wafers, wood, and the like. Suitable examples include plain papers such as XEROX 4200 papers, XEROX Image Series papers, Courtland 4024 DP paper, ruled notebook paper, bond paper, silica coated papers such as Sharp Company silica coated paper, JuJo paper, HAMMERMILL LASERPRINT paper, and the like, glossy coated papers such as XEROX Digital Color Elite Gloss, Sappi Warren Papers LUSTROGLOSS, specialty papers such as Xerox DURAPAPER, and the like, transparency materials, fabrics, textile products, plastics, polymeric films, inorganic recording mediums such as metals and wood, and the like, transparency materials, fabrics, textile products, plastics, polymeric films, inorganic substrates such as metals and wood, and the like.

The inks described herein are further illustrated in the following examples. All parts and percentages are by weight unless otherwise indicated.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

EXAMPLES

The examples set forth herein below and are illustrative of different compositions and conditions that can be used in practicing the present embodiments. All proportions are by weight unless otherwise indicated. It will be apparent, however, that the present embodiments can be practiced with many types of compositions and can have many different uses in accordance with the disclosure above and as pointed out hereinafter.

Selected examples of the synthesized compounds and solid ink compositions were prepared as follows.

Example I

Synthesis of
2-undecyl-5,5-bis(hydroxymethyl)-4H-oxazoline
(Compound 3 of Table 1)

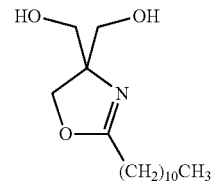

To a 1 Liter Parr reactor equipped with a double turbine agitator and distillation apparatus, was charged in order: dodecanoic acid (200 g; Sigma-Aldrich, Milwaukee, Wis.), tris(hydroxymethyl)aminomethane (92 g; EMD Chemicals, NJ), and butylstannoic acid catalyst (FASCAT 4100; 0.45 grams; Arkema Inc). The contents were heated to 165° C. for a 2 h period, followed by increasing the temperature to 205° C. over a 2 h period, during which time the water distillate was collected in a distillation receiver. The reactor pressure was then reduced to about 1-2 mm-Hg for 1 h, followed by discharging into a tared container and cooling to room temperature. The product was purified by dissolving with mild heating in a mixture of ethyl acetate (2.5 parts) and hexane (10 parts), and then cooling to room temperature to crystallize the pure product as a white granular powder. The peak melting point (by DSC) was determined to be 97° C.

Rheological analysis of this material was measured over a temperature range starting at 130° C. and cooling down to 40° C., using a RFS3 Rheometrics instrument (oscillation frequency of 1 Hz, 25 mm parallel plate geometry, 200 applied strain %). The melt viscosity at 130° C. was 8.2cPs, and the onset of crystallization of this material occurred at 97° C., with a peak viscosity of $4.5 \times 10^6$ cPs.

Example II

Synthesis of
2-heptadecyl-5,5-bis(hydroxymethyl)-4H-oxazoline
(Compound 1 of Table 1)

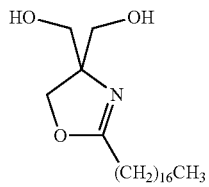

A 1 L Parr reactor equipped with an agitator, distillation apparatus, and bottom drain valve was charged with stearic acid (426 g, obtained from Sigma-Aldrich), tris(hydroxymethyl)aminomethane (181.5 g), and 0.75 g butylstannoic acid (FASCAT 4100). The mixture was heated to 165° C. and stirred at 150 rpm under a nitrogen inert atmosphere. The mixture was then heated to 196° C. over 4 h and maintained at 197-202° C. for an additional 2 h, after which the product was discharged into a tared container. The water by-product (51 g) was collected through the distillation receiver. The product was recrystallized from isopropanol to yield a white product with a sharp melting point at 107° C. as measured by DSC.

Rheological analysis of this material was measured over a temperature range starting at 130° C. and cooling down to 60° C. using a RFS3 Rheometrics instrument (oscillation frequency of 1 Hz, 25 mm parallel plate geometry, 200 applied strain %). The melt viscosity at 130° C. was 3 cPs, and the onset of crystallization of this material occurred at 107° C., with a peak viscosity of $7.2 \times 10^6$ cPs.

Example III

Synthesis of Isosorbide/Succinic Acid Oligoester
(Compound 11 of Table 2)

To a 500 ml round bottomed flask equipped with a Dean-Stark trap and a condenser was added isosorbide (27.61 grams, 189 mmoles, available from Archer Daniels, Midland, Ill., USA), succinic acid (10.63 grams, 90 mmoles, available from Sigma Aldrich) and toluene (200 mL). The reaction mixture was heated gradually under inert atmosphere to about 120° C. (external bath temperature). The reaction mixture was heated at reflux overnight during which about 3 mL water was collected in the Dean Stark trap. The reaction mixture was cooled to room temperature and the crude product was collected as a brownish residue. Toluene was removed by decanting, and the crude product was dissolved in dichloromethane (600 mL) and washed with saturated solution of $NaHCO_3$ (2×200 mL), followed by deionized water (1×200 mL). The solution was dried over MgSO4, and the solvent removed in vacuo and then dried under vacuum for 24 hrs, to afford an fluffy off-white solid. The product was further dried in a vacuum oven (about 200 mm-Hg at 120° C.) overnight, then cooled to room temperature to give a transparent solid material (15 grams). Glass transition (Tg) by DSC: 35° C., Viscosity at 130° C.: 515 cPs, viscosity at 60° C.: $7.3 \times 10^6$ cPs.

Example IV

General Preparation of Inks for K-Proofer Print Tests

Small quantities (from 5 to 15 grams) of ink was prepared for K-proofer printing test and subsequent scratch test for image robustness, using the following procedure as described for Example Ink 1 (10 grams). Into a 30-50 mL glass vessel was charged, in the following order: 6.70 g 2-undecyl-5,5-bis (hydroxymethyl)-4H-oxazoline, prepared as described in Example I(67.0M %), 3.0 g penta-erythritol tetrabenzoate (obtained from Sigma-Aldrich; 30 wt %), and an optional viscosity modifier compound (as noted in Table 4. The materials were first melted together at 130° C. for 1 h, after which was added 0.3 g Orasol Blue GN dye (obtained from Ciba) to the molten mixture. The colored ink mixture was heated at 130° C. while stirring at 300 rpm for an additional 2.5 h. The dark blue molten ink (Ink 1) was then poured into a brass mold and cooled at room temperature to solidify. The solid ink sample was tested next for needle penetrometer hardness, then for K-proofer print test.

Compositions for Examples Inks 1-7 are shown in Table 4 (below) which indicate the relative wt-% proportions of their components. All inks were prepared in a manner similar to Example Ink 1 (described above in Example IV).

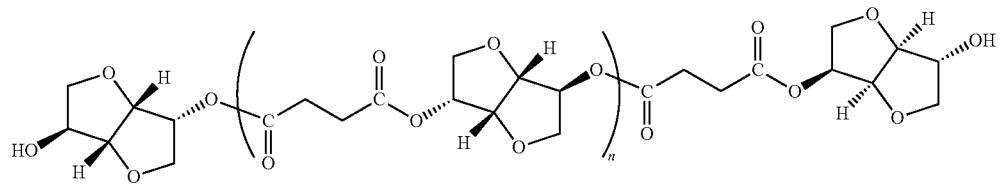

TABLE 4

| COMPONENTS | INK 1 Parts (wt %) | INK 2 Parts (wt %) | INK 3 Parts (wt %) | INK 4 Parts (wt %) | INK 5 Parts (wt %) | INK 6 Parts (wt %) | INK 7 Parts (wt %) |
|---|---|---|---|---|---|---|---|
| Example I (oxazoline) [Phase change component] | 67 | 67 | 67 | | 72 | 67 | 77 |
| Example II (oxazoline) [Phase change component] | | | | 67 | | | |
| Pentaerythritol Tetrabenzoate (Compound 8, Table 2; obtained from Sigma-Aldrich Corp.) [Amorphous resin] | 30 | 30 | 30 | 30 | 15 | 30 | |
| Sucrose Benzoate (Compound 10, Table 2; obtained from Sigma-Aldrich Corp.) [Amorphous resin] | | | | | 10 | | |
| Isosorbide/succinic acid oligomer (Example III - Compound 11, Table 2) [Amorphous resin] | | | | | | | 10 |
| Solvent Blue 36 (obtained from Aakash Chemicals & Dyestuff Inc.) [Colorant] | | | 3 | | | | |
| Solvent Yellow 146 (Orasol Yellow 4GN, obtained from BASF, Germany) [Colorant] | | 3 | | | | | |
| Orasol Blue GN Dye (obtained from BASF, Germany) [Colorant] | 3 | | | 3 | 3 | 3 | 3 |
| SPAN 65 obtained from Sigma-Aldrich Corp.) [Additive] | | | | | | | 10 |
| TOTAL | 100 | 100 | 100 | 100 | 100 | 100 | 100 |

Example V

Preparation of Ink 6

Into a 250 mL stainless steel vessel was charged, in the following order: 67 g of oxazoline of Example I (67 wt %) and 30 g of pentaerythritol tetrabenzoate (compound 8 of Table 2, 30 wt %). The materials were melted at 130° C. for 3 hrs, and then allowed to stir mechanically at 250 rpm while heating at 130'C for 1.5 hrs. Following, 3 g of Orasol Blue GN dye (3 wt % as colorant, obtained from CIBA) was added in portions to the molten mixture of ink components over a period of 30 minutes. The colored ink mixture was allowed to stir an additional 2.5 hrs. The ink was then filtered in a heated KST apparatus through a 5-micron stainless steel mesh filter. The filtered ink was collected into a flexible mold tray and cooled at room temperature to solidify.

Example VI

Properties of Example Inks

Table 5 lists the physical and thermal properties for Ink Examples 1-7 and for the Comparative Solid Ink 1 (Xerox Phaser Cyan Solid Ink). The data in Table 5 along with the rheology profiles shown in FIG. 1, indicate that the inventive inks have comparable jetting viscosities and sharp phase-change transitions (within 5-15° C. range over the ink crystallization event) as the comparative commercial ink. The inks made with the oxazoline phase change component have a good onset temperature for crystallization, broadly ranging between 70° C. and 110° C. Having the onset crystallization of the ink be within this range is desirable so as to control ink jettability as well as the degree of ink penetration into paper and prevent excessive ink showthrough.

TABLE 5

| Ink Properties | Ink 1 | Ink 2 | Ink 3 | Ink 4 | Ink 5 | Ink 6 | Ink 7 | Comparative Ink 1 |
|---|---|---|---|---|---|---|---|---|
| η @ 130° C. (cPs)* | 12.61 | 8.99 | 8.72 | 4.01 | 13.7 | 2.93 | 28.5 | 6.70 |
| Peak Viscosity (cPs)* | $7.98 \times 10^7$ | $5.71 \times 10^7$ | $7.44 \times 10^7$ | $5.84 \times 10^6$ | $4.9 \times 10^7$ | $5.90 \times 10^6$ | $1.0 \times 10^8$ | $7.00 \times 10^7$ |
| $T_{cryst}$ (° C.) (Rheology) | 93 | 90 | 91 | 105 | 93 | 92 | 91 | 88 |
| $T_{cryst}$ (° C.) (DSC)** | 54 | 56.3 | 62 | N/A | 56 | N/A | 53 | N/A |
| $T_{melt}$ (° C.) (DSC)** | 98 | 93 | 93 | N/A | 95 | N/A | 92 | N/A |
| Ink Hardness*** | 78 | 78 | 73 | 80 | 70 | 83 | 67 | 67 |

*Frequency = 1 Hz; 25 mm parallel plate geometry; gap = 0.2 mm; strain % = 200% (strain independent viscosities).

**Measured using DSC method (10° C./min heating and cooling rate from −20° C. to 150° C. and back to −20° C.; data is obtained from second heating cycle to remove thermal history)

N/A = not available

***Measured using the Durometer instrument with 5 g ink samples set in brass molds.

Evaluation of Ink Robustness: Needle Penetrometer Hardness

Each prepared ink was poured into a brass mold to prepare a disk sample of the ink that was approximately 5 mm thick. The ink hardness was measured using a needle penetrometer apparatus, wherein a sharp tip (or needle) is pressed against the surface of a molded sample of ink and the depth of immersion of the sharp tip into the ink surface is measured as a percentage of the total possible distance for immersion of the needle tip, which corresponds to the percentage of needle penetration into the ink. Using the FTC® Durometer Model PS 6400-0-29001 (available from Pacific Transducer Corp., USA) equipped with a Model 476 Stand with standard 1 Kg load, the ink hardness is measured in the above manner and expressed as a hardness value, indicating ink resistance to the penetration of the needle tip, whereby 100 hardness indicates zero penetration of the needle tip into the ink surface (that is, a totally impermeable surface).

Table 5 lists the hardness values for Example Inks 1-7 and compared with Comparative Ink 1 (Xerox Phaser Cyan solid ink), which shows values ranging from about 67 to 83 hard. These values are either moderately or significantly higher than the commercially available ink Comparative Ink 1 (Xerox Phaser Cyan solid ink, 67). This data is an indicator of ink robustness.

Evaluation of Ink Robustness: Scratch Test Procedure

Image robustness of a set of K-proof prints were made on DCEG coated papers (120 gsm stock) with the Example Inks 1, 4 and 6 and Comparative Ink (Xerox Phaser Cyan solid ink) were evaluated using a "coin" scratch test. The coin scratch test was conducted with a modified Taber Industries Linear Abraser (Model 5700) which uses a beveled-edge circular tool (referred to as the "coin" tip, weighing 100 grams) that is run across the surface of the ink print in two test series, one where only 3 cycles of scratches were made, and another with 9 cycles of scratches (both series had scratch frequency setting of 25 cycles/minute). Image analysis software was used to assess how much ink was removed from the scratch zones on the prints, by counting the pixels in the area of paper substrate that is visible, and compares it to the original amount of ink in the same area before scratching. The software pixel count is converted to a unit-less measurement CA (crease area), and the higher the pixel count (or CA value), the more ink is removed from the print to reveal a scratched area (and more whiteness from the paper). It is understood that a perfect non-scratched ink print would have no material being removed and therefore would have very low pixel count (and CA) approaching zero.

As discussed previously, the data in Table 3 shows the CA values (which are directly proportional to pixel count) for the scratched areas of the K-proof ink prints, generated by the coin scratch test. The relative CA data show that three of the Example Inks 1, 4, and 6—each prepared with oxazoline crystalline components and amorphous polyol ester resins—all demonstrated at least a 4-fold improvement in scratch resistance than the Comparative Ink (Xerox Phaser Cyan solid ink), and in some instances about a 10-fold improvement in scratch-resistance.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

All the patents and applications referred to herein are hereby specifically, and totally incorporated herein by reference in their entirety in the instant specification.

What is claimed is:

1. A solid ink composition comprising:
    at least one phase change component;
    at least one amorphous component selected from the group consisting of:

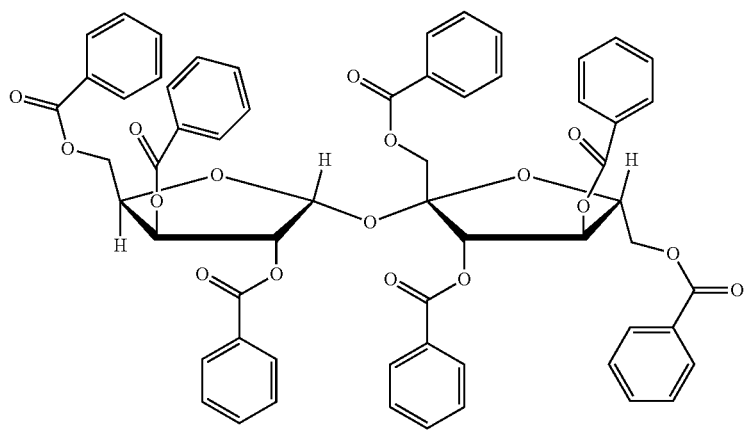

(1)

and;

(2) a compound of formula:

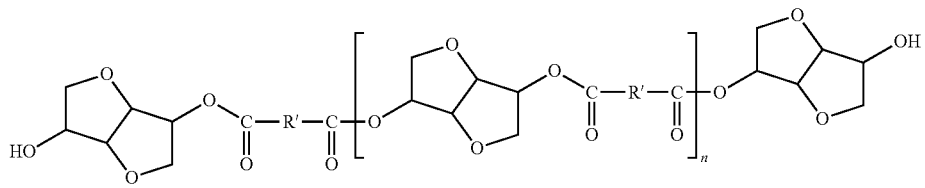

wherein n is an integer from 2 to 10;
R' is:
(a) an alkylene group, comprising linear, branched, saturated, unsaturated, cyclic, substituted, or unsubstituted alkylene groups, wherein hetero atoms selected from oxygen, nitrogen, sulfur, silicon, phosphorus, and boron are optionally present in the alkylene group, the alkylene group comprising about 2 to about 10 carbon atoms;
(b) an arylene group, comprising substituted or unsubstituted arylene groups, wherein hetero atoms selected from oxygen, nitrogen, sulfur, silicon, phosphorus, and boron are optionally present in the alkylene group, the arylene group comprising about 6 to about 20 carbon atoms;
(c) an arylalkylene group, comprising substituted or unsubstituted arylalkylene groups, wherein the alkyl portion of the arylalkylene group can be linear, branched, saturated, unsaturated, cyclic, or combinations thereof; wherein hetero atoms selected from oxygen, nitrogen, sulfur, silicon, phosphorus, and boron are independently optionally present in the alkyl portion or the aryl portion of the arylalkylene group, the arylalkylene group comprising about 7 to about 20 carbon atoms; and
(d) an alkylarylene group, including substituted and unsubstituted alkylarylene groups, wherein the alkyl portion of the alkylarylene group can be linear, branched, saturated, unsaturated, and/or cyclic; and wherein hetero atoms, such as oxygen, nitrogen, sulfur, silicon, phosphorus, boron, and the like either may or may not be present in either or both of the alkyl portion and the aryl portion of the alkylarylene group, in one embodiment with at least about 7 carbon atoms, and in one embodiment with no more than about 20 carbon atoms, in another embodiment with no more than about 18 carbon atoms, and in yet another embodiment with no more than about 16 carbon atoms, although the number of carbon atoms can be outside of these ranges, such as tolylene or the like, and wherein the substituents substituted alkylene, arylene, arylalkylene, or alkylarylene groups are selected from the group consisting of hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, cyanato groups, isocyanato groups, thiocyanato groups, isothiocyanato groups, carboxylate groups, carboxylic acid groups, urethane groups, urea groups, and combinations thereof, and wherein two or more substituents can be joined together to form a ring;

a colorant; and optionally a viscosity modifier, wherein the phase change component is crystalline and comprises one or more substituted oxazoline compounds, substituted oxazoline derivatives, or both; and further wherein the solid ink composition exhibits a phase change transition from a liquid to a solid and further wherein the crystalline phase change component and amorphous component are blended in a weight ratio of from about 50:50 to about 95:5.

2. The solid ink composition of claim 1, wherein the one or more oxazoline compounds or derivatives are represented by the following formula

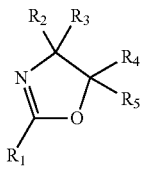

wherein:
$R_1$ is:
  (1) an alkyl group, including substituted and unsubstituted alkyl groups, wherein hetero atoms either may or may not be present in the alkyl group;
  (2) an aryl group, including substituted and unsubstituted aryl groups, wherein hetero atoms either may or may not be present in the aryl group;
  (3) an arylalkyl group, including substituted and unsubstituted arylalkyl groups, wherein hetero atoms either may or may not be present in either or both of the alkyl portion and the aryl portion of the arylalkyl group; or
  (4) an alkylaryl group, including substituted and unsubstituted alkylaryl groups, wherein hetero atoms either may or may not be present in either or both of the alkyl portion and the aryl portion of the alkylaryl group; and
$R_2$, $R_3$, $R_4$, and $R_5$ each, independently of the other, are:
  (1) hydrogen atoms;
  (2) halogen atoms;
  (3) alkyl groups, including substituted and unsubstituted alkyl groups, wherein hetero atoms either may or may not be present in the alkyl group;
  (4) aryl groups, including substituted and unsubstituted aryl groups, wherein hetero atoms either may or may not be present in the aryl group;
  (5) arylalkyl groups, including substituted and unsubstituted arylalkyl groups, wherein hetero atoms either may or may not be present in either or both of the alkyl portion and the aryl portion of the arylalkyl group; or
  (6) alkylaryl groups, including substituted and unsubstituted alkylaryl groups, wherein hetero atoms either may or may not be present in either or both of the alkyl portion and the aryl portion of the alkylaryl group.

3. The solid ink composition of claim 1, wherein the crystalline component is present in an amount of from about 50 percent to about 95 percent by weight of the total weight of the solid ink composition.

4. The solid ink composition of claim 1, wherein the amorphous component is present in an amount of from about 5 percent to about 50 percent by weight of the total weight of the solid ink composition.

5. The solid ink composition of claim 1, wherein the crystalline component has a viscosity of from about 0.5 to about 15 cps at a temperature of about 140° C.

6. The solid ink composition of claim 1, wherein the amorphous component has a viscosity of from about 1 to about 2000 cps at a temperature of about 140° C.

7. The solid ink composition of claim 1, wherein the amorphous component has a viscosity at least $10^5$ cps at room temperature.

8. The solid ink composition of claim 1, wherein the crystalline component exhibits crystallization ($T_{crys}$) and melting ($T_{melt}$) peaks and the difference between the peaks ($T_{melt}$-$T_{crys}$) is less than 60° C.

9. The solid ink composition of claim 1, wherein the crystalline component has a melting point of above 60° C.

10. The solid ink composition of claim 1, wherein the amorphous component has a $T_g$ value of from about 0 to about 50° C.

11. The solid ink composition of claim 1 further including one or more additives selected from the group consisting of compatibilizers, synergists, rheology modifiers, tackifiers, plasticizers and mixtures thereof.

12. The solid ink composition of claim 1, wherein the viscosity modifier is selected from the group of sorbitol esters, esters of polyol, a substituted or unsubstituted alkanamide, or mixtures thereof.

13. The solid ink composition of claim 1 having a viscosity of less than about 20 cps at about 140° C. and a viscosity of at least about $10^6$ cps at a temperature between about 20 and about 35° C.

14. The solid ink composition of claim 1 having a hardness value of at least about 60.

15. The solid ink composition of claim 1, wherein the colorant is selected from the group consisting of a dye, pigment, and mixtures thereof.

16. A solid ink composition comprising:
at least one phase change component;
at least one amorphous component selected from the group consisting of:

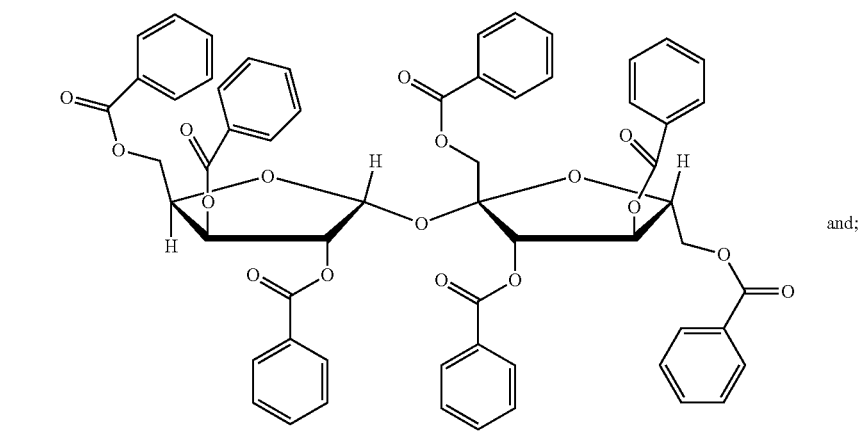

(1)

and;

(2) a compound of formula:

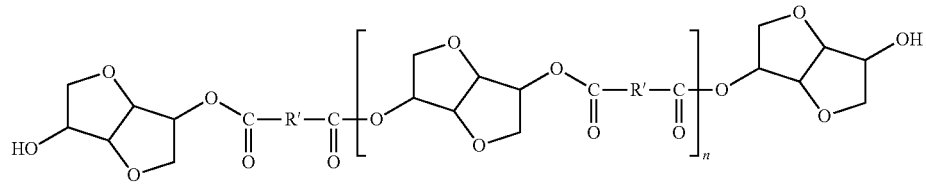

wherein n is an integer from 2 to 10;
R' is:
(a) an alkylene group, comprising linear, branched, saturated, unsaturated, cyclic, substituted, or unsubstituted alkylene groups, wherein hetero atoms selected from oxygen, nitrogen, sulfur, silicon, phosphorus, and boron are optionally present in the alkylene group, the alkylene group comprising about 2 to about 10 carbon atoms;
(b) an arylene group, comprising substituted or unsubstituted arylene groups, wherein hetero atoms selected from oxygen, nitrogen, sulfur, silicon, phosphorus, and boron are optionally present in the alkylene group, the arylene group comprising about 6 to about 20 carbon atoms;
(c) an arylalkylene group, comprising substituted or unsubstituted arylalkylene groups, wherein the alkyl portion of the arylalkylene group can be linear, branched, saturated, unsaturated, cyclic, or combinations thereof; wherein hetero atoms selected from oxygen, nitrogen, sulfur, silicon, phosphorus, and boron are independently optionally present in the alkyl portion or the aryl portion of the arylalkylene group, the arylalkylene group comprising about 7 to about 20 carbon atoms; and
(d) an alkylarylene group, including substituted and unsubstituted alkylarylene groups, wherein the alkyl portion of the alkylarylene group can be linear, branched, saturated, unsaturated, and/or cyclic; and wherein hetero atoms, such as oxygen, nitrogen, sulfur, silicon, phosphorus, boron, and the like either may or may not be present in either or both of the alkyl portion and the aryl portion of the alkylarylene group, in one embodiment with at least about 7 carbon atoms, and in one embodiment with no more than about 20 carbon atoms, in another embodiment with no more than about 18 carbon atoms, and in yet another embodiment with no more than about 16 carbon atoms, although the number of carbon atoms can be outside of these ranges, such as tolylene or the like, and
wherein the substituents substituted alkylene, arylene, arylalkylene, or alkylarylene groups are selected from the group consisting of hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, cyanato groups, isocyanato groups, thiocyanato groups, isothiocyanato groups, carboxylate groups, carboxylic acid groups, urethane groups, urea groups, and combinations thereof, and wherein two or more substituents can be joined together to form a ring;
a colorant; and
optionally a viscosity modifier, wherein the phase change component comprises one or more substituted oxazoline compounds, substituted oxazoline derivatives, or both represented by the following formula

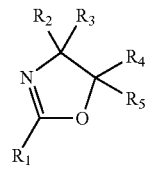

wherein $R_1$ is an alkyl group of from about 1 to about 55 carbon atoms, $R_2$, $R_3$, $R_4$ and $R_5$ are alkyl, an alkyl alcohol or an alkyl ester, each alkyl containing from about 1 to about 55 carbon atoms; and further wherein the solid ink composition exhibits a phase change transition from a liquid to a solid within a temperature change of about 20° C. and further wherein the crystalline phase change component and amorphous component are blended in a weight ratio of from about 50:50 to about 95:5.

17. A solid ink composition comprising:
at least one phase change component;
at least one amorphous component selected from the group consisting of:

(1)

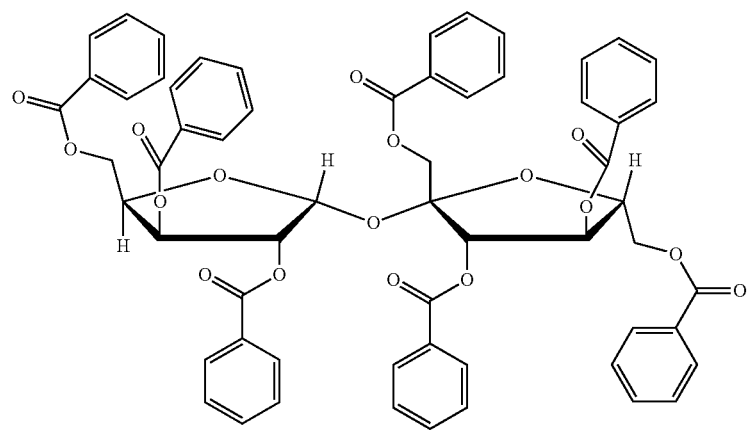

and;

(2) a compound of formula:

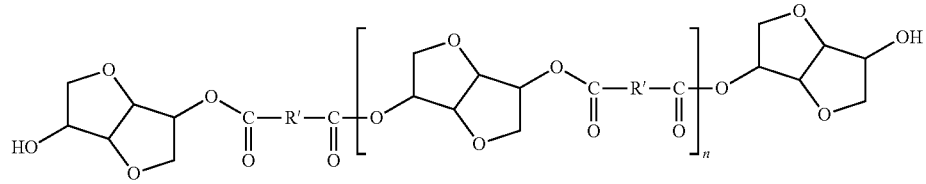

wherein n is an integer from 2 to 10;
R' is:
(a) an alkylene group, comprising linear, branched, saturated, unsaturated, cyclic, substituted, or unsubstituted alkylene groups, wherein hetero atoms selected from oxygen, nitrogen, sulfur, silicon, phosphorus, and boron are optionally present in the alkylene group, the alkylene group comprising about 2 to about 10 carbon atoms;
(b) an arylene group, comprising substituted or unsubstituted arylene groups, wherein hetero atoms selected from oxygen, nitrogen, sulfur, silicon, phosphorus, and boron are optionally present in the alkylene group, the arylene group comprising about 6 to about 20 carbon atoms;
(c) an arylalkylene group, comprising substituted or unsubstituted arylalkylene groups, wherein the alkyl portion of the arylalkylene group can be linear, branched, saturated, unsaturated, cyclic, or combinations thereof; wherein hetero atoms selected from oxygen, nitrogen, sulfur, silicon, phosphorus, and boron are independently optionally present in the alkyl portion or the aryl portion of the arylalkylene group, the arylalkylene group comprising about 7 to about 20 carbon atoms; and
(d) an alkylarylene group, including substituted and unsubstituted alkylarylene groups, wherein the alkyl portion of the alkylarylene group can be linear, branched, saturated, unsaturated, and/or cyclic; and wherein hetero atoms, such as oxygen, nitrogen, sulfur, silicon, phosphorus, boron, and the like either may or may not be present in either or both of the alkyl portion and the aryl portion of the alkylarylene group, in one embodiment with at least about 7 carbon atoms, and in one embodiment with no more than about 20 carbon atoms, in another embodiment with no more than about 18 carbon atoms, and in yet another embodiment with no more than about 16 carbon atoms, although the number of carbon atoms can be outside of these ranges, such as tolylene or the like, and
wherein the substituents substituted alkylene, arylene, arylalkylene, or alkylarylene groups are selected from the group consisting of hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, cyanato groups, isocyanato groups, thiocyanato groups, isothiocyanato groups, carboxylate groups, carboxylic acid groups, urethane groups, urea groups, and combinations thereof, and wherein two or more substituents can be joined together to form a ring;
a colorant; and
optionally a viscosity modifier, wherein the phase change component is crystalline and comprises one or more substituted oxazoline compounds, substituted oxazoline derivatives, or both; and further wherein the solid ink composition exhibits a phase change transition from a liquid to a solid within a temperature change of about 20° C., and the phase transition occurs at a temperature between about 45 and about 130° C. and further wherein the crystalline phase change component and amorphous component are blended in a weight ratio of from about 50:50 to about 95:5.

* * * * *